United States Patent
Yamada et al.

(10) Patent No.: US 7,860,505 B2
(45) Date of Patent: Dec. 28, 2010

(54) MOBILE COMMUNICATION SYSTEM, EXTENSION TRANSMISSION/RECEPTION SERVER, EXTENSION TRANSMISSION/RECEPTION CONTROLLER, BASE STATION, RADIO NETWORK CONTROLLER, MOBILE STATION AND COMMUNICATION METHOD

(75) Inventors: Mayu Yamada, Mitaka (JP); Akihiro Maebara, Yokohama (JP); Masayuki Koshino, Fujisawa (JP); Masafumi Masuda, Yokosuka (JP); Seizo Onoe, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 851 days.

(21) Appl. No.: 10/860,497

(22) Filed: Jun. 4, 2004

(65) Prior Publication Data
US 2005/0014498 A1 Jan. 20, 2005

(30) Foreign Application Priority Data
Jun. 5, 2003 (JP) ............................ P2003-161254

(51) Int. Cl.
*H04W 40/00* (2009.01)
(52) U.S. Cl. ................................. 455/445; 455/422.1
(58) Field of Classification Search ............ 455/7–13.1, 455/445, 422.1, 560
See application file for complete search history.

(56) References Cited

U.S. PATENT DOCUMENTS

| | | | | |
|---|---|---|---|---|
| 4,125,808 A | * | 11/1978 | Graham | 455/7 |
| 5,034,993 A | * | 7/1991 | Sasuta et al. | 455/7 |
| 5,475,689 A | * | 12/1995 | Kay et al. | 370/337 |
| 6,061,566 A | * | 5/2000 | Friman | 455/445 |
| 6,141,531 A | * | 10/2000 | Williams et al. | 455/7 |
| 6,535,731 B1 | * | 3/2003 | Pillekamp et al. | 455/444 |
| 6,804,491 B1 | * | 10/2004 | Uesugi | 455/11.1 |
| 6,842,617 B2 | * | 1/2005 | Williams et al. | 455/444 |
| 6,870,846 B2 | * | 3/2005 | Cain | 370/392 |
| 6,894,992 B1 | * | 5/2005 | Morvan et al. | 370/329 |
| 6,973,053 B1 | * | 12/2005 | Passman et al. | 370/310 |
| 6,999,718 B2 | * | 2/2006 | Miyazaki | 455/7 |
| 2001/0055300 A1 | * | 12/2001 | Chen | 370/352 |
| 2003/0103496 A1 | * | 6/2003 | Lakshmi Narayanan et al. | 370/352 |

FOREIGN PATENT DOCUMENTS

| | | |
|---|---|---|
| CN | 1463128 A | 12/2003 |
| JP | 9-510061 | 10/1997 |
| JP | 11-298968 | 10/1999 |
| JP | 2000-83273 | 3/2000 |
| JP | 2002-535889 | 10/2002 |
| WO | WO 02/098154 | * 12/2002 |

OTHER PUBLICATIONS

Takeshi Hattori, et al., "Wireless Broadband Textbook", IDG Japan Co., Ltd., Jun. 10, 2002, pp. 26-37, (with English translation).

* cited by examiner

*Primary Examiner*—Lana N Le
*Assistant Examiner*—Ping Y Hsieh
(74) *Attorney, Agent, or Firm*—Oblon, Spivak, McClelland, Maier & Neustadt, L.L.P.

(57) ABSTRACT

A mobile communication system includes an extension transmission/reception server configured to transmit/receive user data transmitted/received between mobile stations to/from a base station by using an extension transmission/reception transmitting/receiving the data within a radio access network, and the base station configured to transmit/receive the user data to/from the extension transmission/reception server.

8 Claims, 12 Drawing Sheets

FIG.8
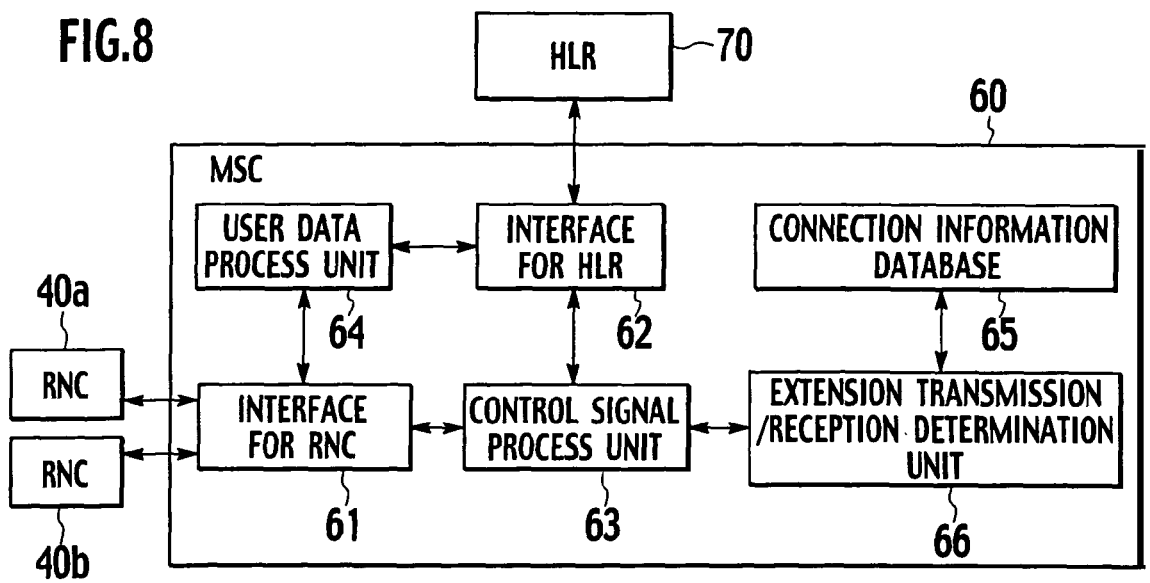
FIG.9
| BS NAME | NAME OF EXTENSION TRANSMISSION /RECEPTION SERVER | IP ADDRESS OF EXTENSION TRANSMISSION /RECEPTION SERVER |
|---|---|---|
| BS01 | SERVER01 | 255.255.255.3 |
| BS02 | SERVER01 | 255.255.255.3 |
| BS03 | SERVER02 | 255.255.255.5 |
| BS04 | – | – |
|  |  |  |
|  |  |  |
FIG.10
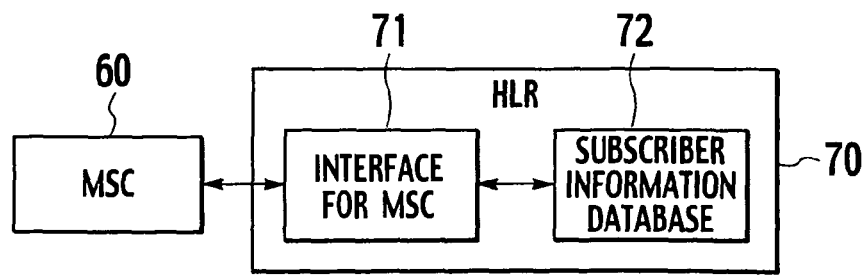

| BS NAME | TRAFFIC LOAD (CHANNEL USAGE RATE) | EXTENSION TRAFFIC THRESHOLD |
|---|---|---|
| BS01 | 30% | 80% |
| BS02 | 10% | 80% |
| BS03 | 80% | 80% |
| BS04 | 20% | 80% |
| ⋮ | ⋮ | ⋮ |
| ⋮ | ⋮ | ⋮ |

…

MOBILE COMMUNICATION SYSTEM, EXTENSION TRANSMISSION/RECEPTION SERVER, EXTENSION TRANSMISSION/RECEPTION CONTROLLER, BASE STATION, RADIO NETWORK CONTROLLER, MOBILE STATION AND COMMUNICATION METHOD

CROSS REFERENCE TO RELATED APPLICATIONS

This application is based upon and claims the benefit of priority from the prior Japanese Patent Application No. P2003-161254, filed on Jun. 5, 2003; the entire contents of which are incorporated herein by reference.

BACKGROUND OF THE INVENTION

1. Field of the Invention

The present invention relates to a mobile communication system, an extension transmission/reception server, an extension transmission/reception controller, a base station, a radio network controller, a mobile station and a communication method.

2. Description of the Related Art

A conventional mobile communication system 400 consists of a plurality of MSs (mobile station) 410a and 410b, which connects to a plurality of BSs (base station) 420a and 420b, a radio access network 450 and a core network 480 conforming to the 3GPP (Third Generation Partnership Project), as shown in FIG. 1. The radio access network 450 consists of a plurality of RNCs (radio network controller) 440a and 440b and the plurality of BSs 420a and 420b, which connects to the RNCs 440a and 440b. The core network 480 consists of an MSC (mobile switching center) 460, which connects to the RNCs 440a and 440b, and a HLR (home location register) 470, which connects to the MSC 460 ("Textbook for wireless broadband", under editorship of Takeshi Hattori and Masanobu Fujioka, IDG Japan Inc., Jun. 10, 2002; pp. 26-37).

In the mobile communication system 400, the communication is carried out in the procedure shown in FIG. 2. FIG. 2 shows a case where the MS 410a, which exists in the radio zone of the BS 420a, is the communication source; and the MS 410b is the communication destination. When starting communication, the MS 410a connects to the RNC 440a via the BS 420a. And the MS 410a transmits a call request to the RNC 440a (S401). The RNC 440a inquires the MSC 460 whether or not the connection to the communication destination MS 410b is available (S402). The MSC 460 retrieves the HLR 470, and obtains information about the MS 410b from the HLR 470 (S403).

Based on the obtained information about the MS 410b, the MSC 460 determines whether or not the RNC 440a can connect to the communication destination MS 410b via the BS 420b, the RNC 440b and the MSC 460 to which the MS 410b connects. When it is determined as connectable, the MSC 460 instructs the RNC 440a to connect to the MS 410b (S404). Also, the MSC 460 calls the MS 410b and receives a call response from the MS 410b (S405).

When receiving the instruction, the RNC 440a connects to the BS 420a (S406). The MS 410a transmits user data for the MS 410b to the BS 420a; thus the communication is started (S407). Accordingly, as shown in FIG. 3, in the mobile communication system 400, a path C of the user data always goes through the MSC 460. That is, in the mobile communication system 400, every call is processed via the MSC 460.

Therefore, even when the communication destination MS and the communication source MS exist under the control of the same BS, the user data has to go through such redundant path that goes via the MSC. Therefore, many lines for that are required; and line use fee for the paths that go via the MSC; and delay due to those paths is resulted in. Ordinarily, in many cases, in order to integrate the functions, the RNC and the MSC are located in a place away from the BS. In such case, the above problem appears remarkably.

To cope with the above problem, the following technique has been proposed. That is, MSCs, which have, in the functions of the conventional MSC, a function to process the communication with the MSs existing under the control of one BS or a small number of BSs, are distributed in places near these BSs (hereinafter, referred to as "distribution MSCs"). In this case, in a hierarchy higher than the distribution MSCs, a MSC, which has the function of the conventional MSC, is provided (hereinafter, referred to as "integration MSC"). Owing to this, when both of the communication source MS and communication destination MS exist under the control of the same distribution MSC, the path for the user data can be reduced. Accordingly, in this case, the line use fee for the path via the MSC, which is counted when only the conventional MSC is available, can be reduced, and the delay due to the path can be reduced.

BRIEF SUMMARY OF THE INVENTION

However, even when the distribution MSCs are provided, when a communication is carried out between the MSs, which exist under the control of the different distribution MSCs, the user data have to use a redundant path, which goes through the integration MSC. Accordingly, in this case, as a result, many lines are required for the paths by using the integration MSC. Accordingly, the line use fee for the paths is counted; and the delay due to the paths is resulted in. Further, when distribution MSCs are provided, both of the distribution MSCs and the integration MSC must possess a function to process the communication between the MSs. Accordingly, the functions of the mobile communication system become redundant. Furthermore, the integration effect to integrally process the control data, which the MSC originally possesses, impairs. Accordingly, an object of the present invention is to shorten the path for the user data.

A mobile communication system includes an extension transmission/reception server configured to transmit/receive user data transmitted/received between mobile stations to/from a base station by using an extension transmission/reception transmitting/receiving the data within a radio access network, and the base station configured to transmit/receive the user data to/from the extension transmission/reception server.

The radio access network is a network configured to relay the data between a mobile station and a core network including a mobile switching center. According to the mobile communication system as described above, the user data can be transmitted/received among the BSs and the extension transmission/reception server by using the extension transmission/reception. Accordingly, in the mobile communication system, the user data can be transmitted/received without using the mobile switching center, which is located outside the radio access network. Accordingly, the mobile communication system can shorten the path for the user data.

An extension transmission/reception server includes a base station transmission/reception unit configured to transmit/receive user data transmitted/received between mobile stations to/from a base station by using an extension transmission/reception transmitting/receiving the data within a radio access network.

According to the extension transmission/reception server as described above, the base station transmission/reception unit transmits/receives the user data to/from the BS by using the extension transmission/reception. Accordingly, the mobile communication system can transmit/receive the user data to/from the base station without using the mobile switching center located outside the radio access network. Accordingly, the extension transmission/reception server can shorten the path for the user data.

An extension transmission/reception controller includes an extension transmission/reception determination unit configured to determine whether or not user data transmitted/received between mobile stations is transmitted/received by using an extension transmission/reception transmitting/receiving the data within a radio access network. According to the extension transmission/reception controller as described above, the mobile communication system may not uniformly use the extension transmission/reception for transmitting/receiving the user data, but can use the extension transmission/reception depending on the conditions.

A base station includes a user data transmission/reception unit configured to transmit/receive user data by using an extension transmission/reception transmitting/receiving the user data within a radio access network to/from an extension transmission/reception server configured to transmit/receive the user data to/from the base station by using the extension transmission/reception.

According to the base station as described above, the user data transmission/reception unit can transmit/receive the user data to/from the extension transmission/reception server without transmitting/receiving the user data to/from the mobile switching center located outside the radio access network. Accordingly, the base station can shorten the path for the user data.

Also, the base station may include a base station transmission/reception unit configured to transmit/receive user data transmitted/received between mobile stations to/from another base station by using an extension transmission/reception transmitting/receiving the user data within a radio access network. According to the base station as described above, the base station transmission/reception unit transmits/receives the user data to/from another base station by using the extension transmission/reception. Accordingly, the base station can transmit/receive the user data to/from another base station without using the mobile switching center located outside the radio access network. Accordingly, the base station can shorten the path for the user data.

A radio network controller includes a base station transmission/reception unit configured to transmit/receive user data transmitted/received between mobile stations to/from a base station by using an extension transmission/reception transmitting/receiving the user data within a radio access network. Accordingly, the radio network controller can transmit/receive the user data to/from the base station without using the mobile switching center located outside the radio access network. Accordingly, the radio network controller can shorten the path for the user data.

A mobile station includes a request transmission unit configured to transmit an extension transmission/reception request requesting user data to be transmitted/received by using an extension transmission/reception transmitting/receiving the user data within a radio access network. According to the mobile station as described above, when a user of the mobile station desires the user data to be transmitted/received by using the extension transmission/reception, the mobile station can request for the transmission/reception of the user data by using the extension transmission/reception.

A communication method includes transmitting/receiving user data transmitted/received between mobile stations by using an extension transmission/reception transmitting/receiving the user data within a radio access network.

BRIEF DESCRIPTION OF THE SEVERAL VIEWS OF THE DRAWINGS

FIG. 8 is a block diagram showing configuration of a mobile switching center in accordance with the first embodiment of the present invention.

FIG. 9 is a diagram showing a connection information database in accordance with the first embodiment of the present invention.

FIG. 10 is a block diagram showing configuration of an HLR in accordance with first embodiment of the present invention.

DETAILED DESCRIPTION OF THE INVENTION

Embodiment 1

Mobile Communication System

Figure 1:
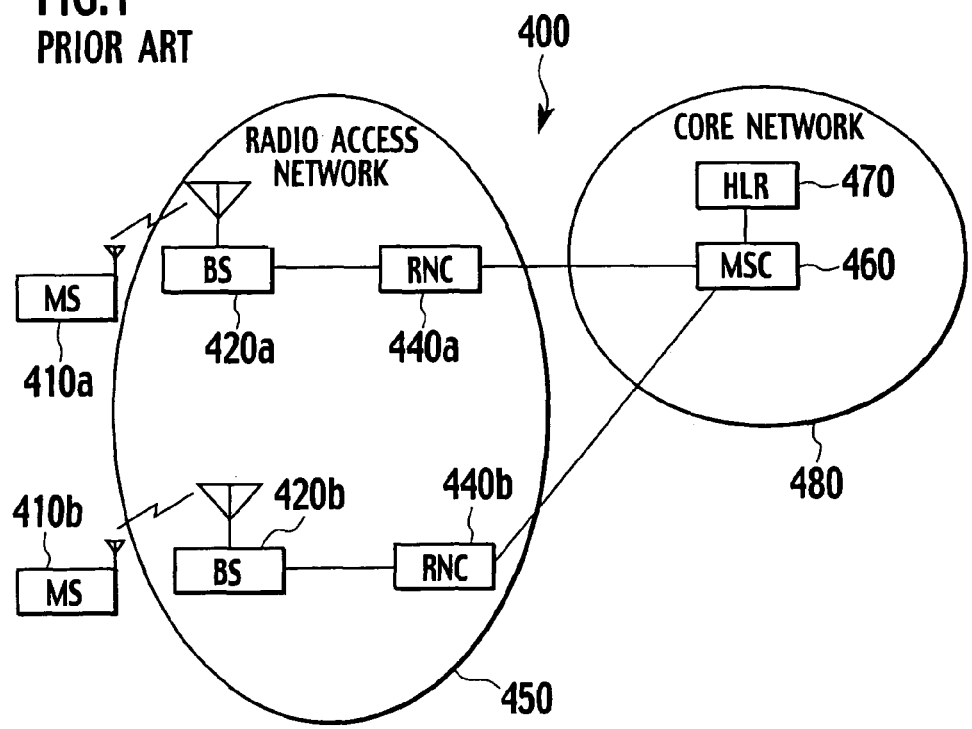
FIG. 1 is a view showing configuration of a conventional mobile communication system.
Figure 2:
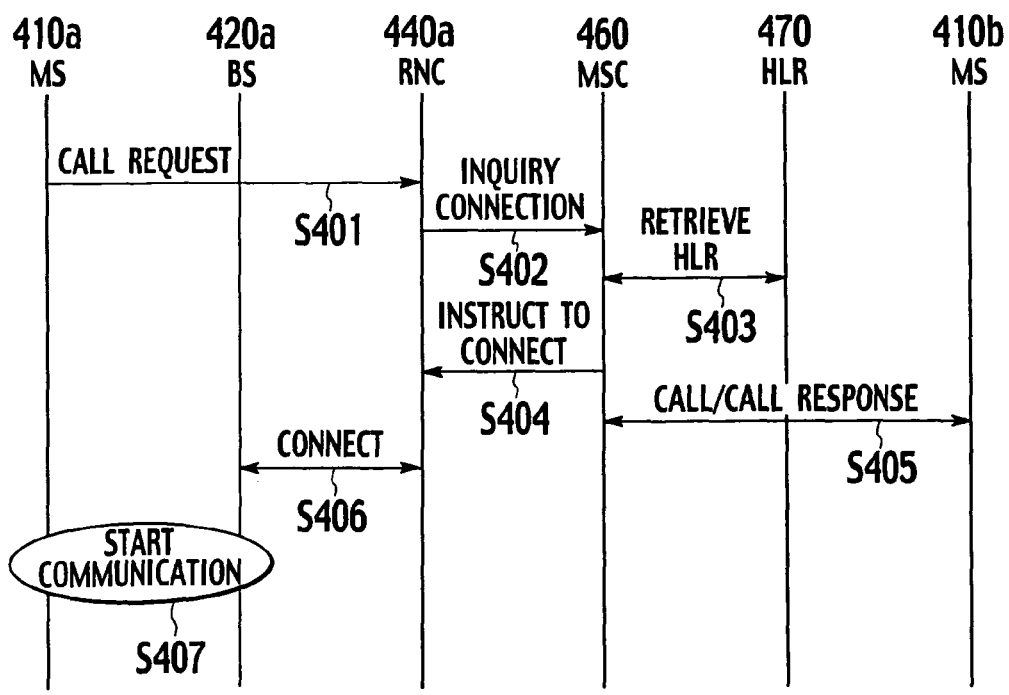
FIG. 2 is a flow chart showing a procedure of a conventional communication method.
Figure 3:
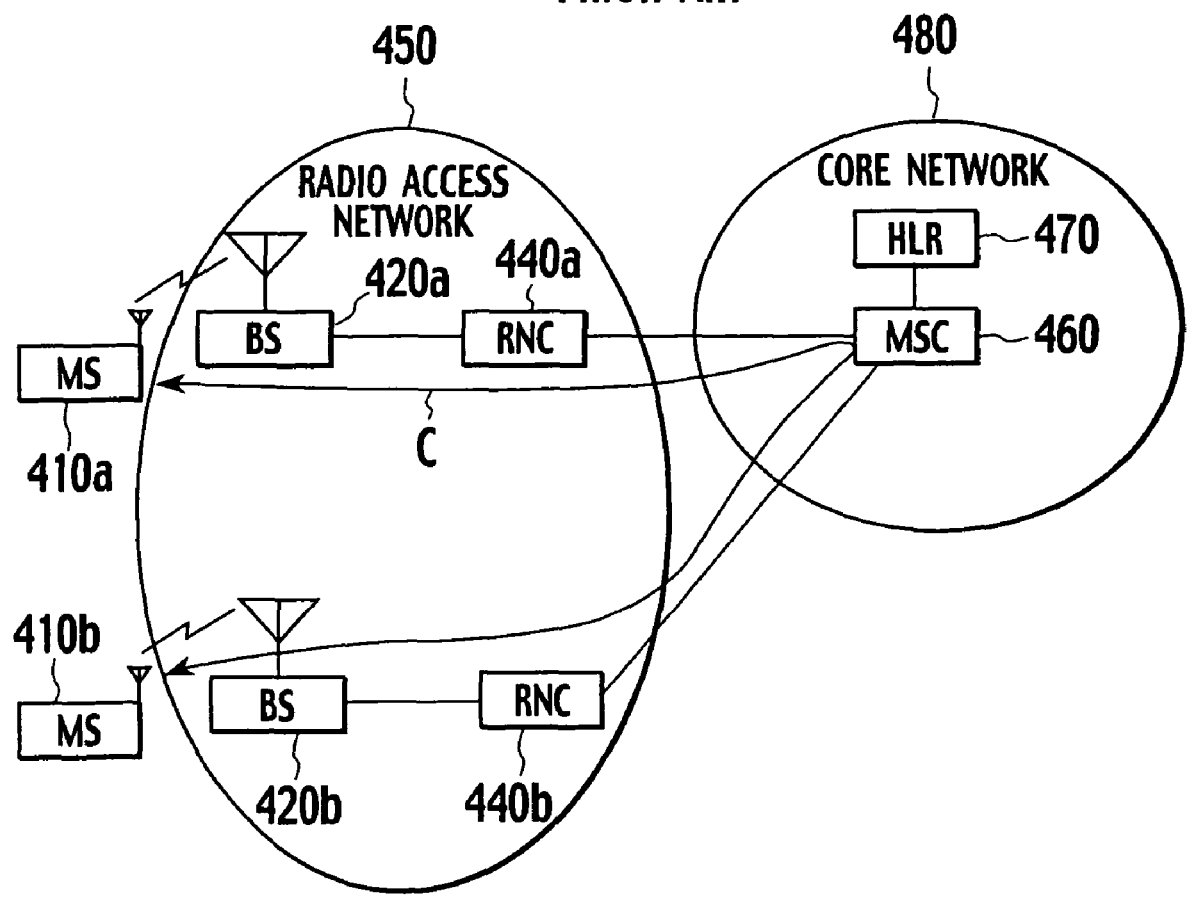
FIG. 3 is a view showing conventional paths for user data.
Figure 4:
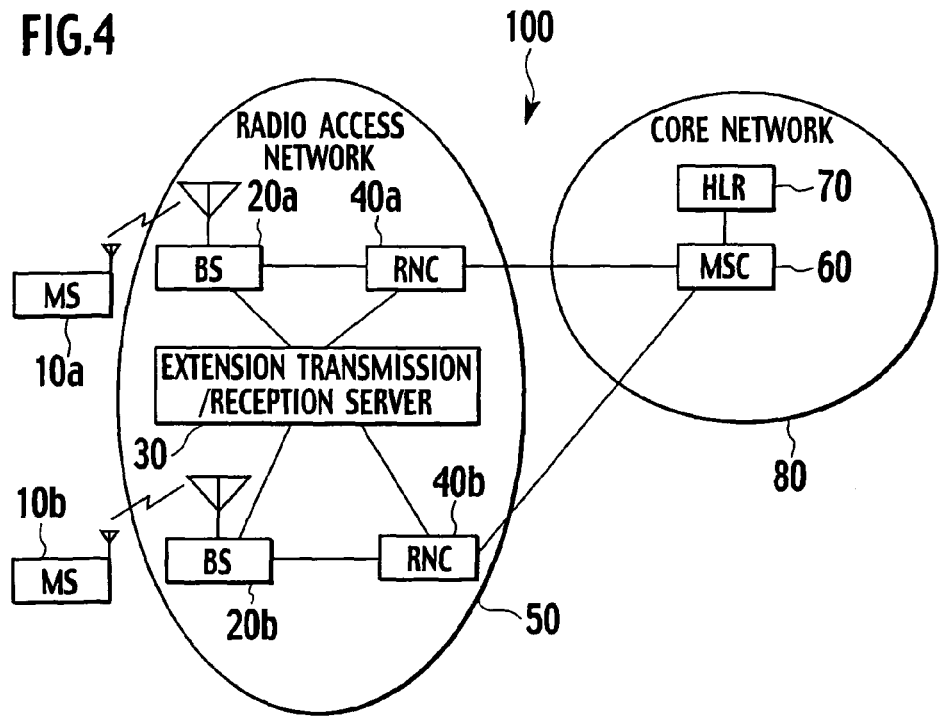
FIG. 4 is a view showing configuration of a mobile communication system in accordance with a first embodiment of the present invention.

As shown in FIG. 4, a mobile communication system 100 includes a plurality of MSs (mobile station) 10a and 10b, a radio access network 50 and a core network 80. The radio access network 50 includes a plurality of BSs (base station) 20a and 20b, an extension transmission/reception server 30 and a plurality of RNCs (radio network controller) 40a and 40b. The core network 80 includes a MSC (mobile switching center) 60 and a HLR (home location register) 70.

The MSs 10a and 10b perform radio communication with the BSs to transmit/receive data therebetween via radio. Each of the MSs 10a and 10b connects to the BSs 20a and 20b via the radio, and exists under the control of the BSs 20a and 20b respectively. Each of the MSs 10a and 10b transmits/receives user data and control data to/from the BSs 20a, 20b respectively. A plurality of MSs may connect to a single BS. Further, each of the MSs 10a and 10b may perform both of transmission/reception of data, or may perform transmission only or reception only of data.

The radio access network 50 relays data between the ms and the core network 80 including the MSC 60. The radio access network 50 uses the BSs 20a and 20b and the RNCs 40a and 40b to relay data between the MS and the core network 80.

The BSs 20a and 20b perform radio communication with the MSs 10a and 10b to transmit/receive data via the radio. The BSs 20a and 20b connect to the MSs 10a and 10b respectively via the radio. Also, the BSs 20a and 20b connect to the RNCs 40a and 40b respectively. Further, the BSs 20a and 20b connect to the extension transmission/reception server 30. Each of the BSs 20a and 20b transmits/receives user data and control data to/from the MS 10a and 10b, and to/from the RNCs 40a and 40b.

The control data includes mobile station control data (hereinafter, referred to as "MS control data"), which is transmitted/received between the MSs 10a and 10b, and control data concerning the extension transmission/reception (hereinafter, referred to as "extension transmission/reception control data"). Each of the BSs 20a and 20b transmits/receives user data to/from the extension transmission/reception server 30 respectively. A plurality of BSs may be provided to a single RNC. Also, a plurality of extension transmission/reception servers may connect to a single BS.

Figure 5:
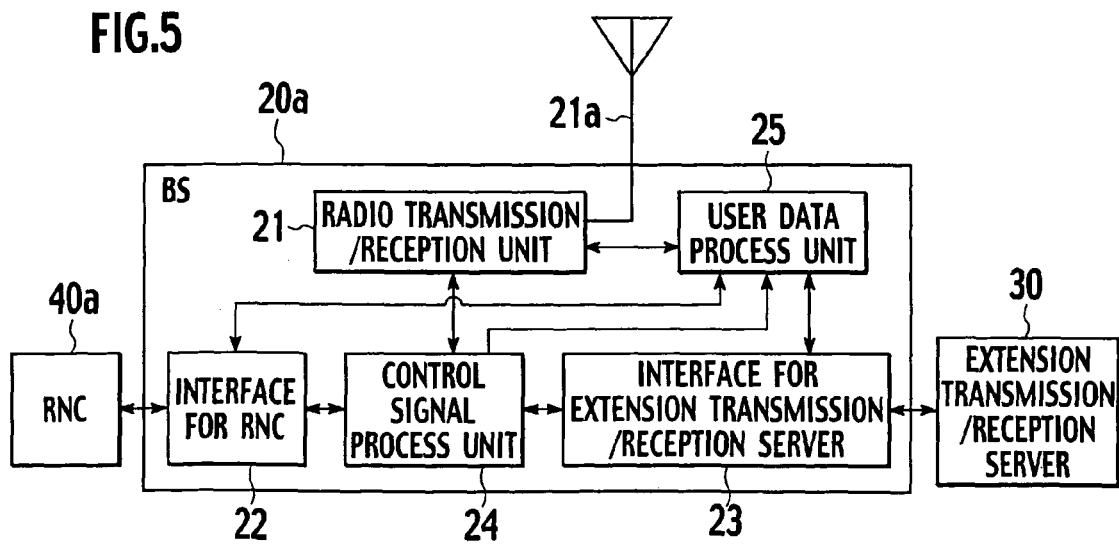
FIG. 5 is a block diagram showing configuration of a base station in accordance with the first embodiment of the present invention.

As shown in FIG. 5, the BS 20a includes a radio transmission/reception unit 21, an interface for RNC 22, an interface for extension transmission/reception server 23, a control signal process unit 24 and a user data process unit 25. The radio transmission/reception unit 21 performs radio communication for transmitting/receiving user data and MS control data to/from the MS 10a via radio. The radio transmission/reception unit 21 connects to an antenna 21a to perform radio communication with the MS 10a via the antenna 21a. The interface for RNC 22 transmits/receives the user data and the control data to/from the RNC 40a. The interface for RNC 22 functions as a control data transmission/reception unit, which transmits/receives MS control data to be transmitted/received between the MSs 10a and 10b via the MSC 60. The interface for extension transmission/reception server 23 is a user data transmission/reception unit that transmits/receives the user data to/from the extension transmission/reception server 30 by using the extension transmission/reception, which transmits/receives the data within the radio access network 50.

The control signal process unit 24 processes the control data, which are transmitted/received by the radio transmission/reception unit 21, the interface for RNC 22 and the interface for extension transmission/reception server 23. Specifically, the control signal process unit 24 obtains MS control data, which are received by the radio transmission/reception unit 21, from the radio transmission/reception unit 21, and inputs the data to the interface for RNC 22. The control signal process unit 24 obtains MS control data, which are received by the interface for RNC 22, from the interface for RNC 22, and inputs the data to the radio transmission/reception unit 21.

Further, the control signal process unit 24 obtains extension transmission/reception control data, which are received by the interface for RNC 22 and the interface for extension transmission/reception server 23, from the interface for RNC 22 and the interface for extension transmission/reception server 23. And, the control signal process unit 24 controls the user data process unit 25 based on the obtained extension transmission/reception control data. The extension transmission/reception control data includes, for example, a notification of implementation of the transmission/reception of the user data by using the extension transmission/reception, a notification of IP address of the extension transmission/reception server 30, which is used for the extension transmission/reception, information for determining whether or not the user data is transmitted/received using the extension transmission/reception (hereinafter, referred to as "determination information") and a request for determination information. Accordingly, for example, the control signal process unit 24 gives an instruction to the user data process unit 25 to transmit/receive the user data by using the extension transmission/reception via the extension transmission/reception server 30, which has the notified IP address. Further, the control signal process unit 24 generates extension transmission/reception control data and inputs the data to the interface for RNC 22 and the interface for extension transmission/reception server 23.

The user data process unit 25 processes the user data, which are transmitted and received by the radio transmission/reception unit 21 and the interface for extension transmission/reception server 23. Specifically, the user data process unit 25 obtains the user data, which are received by the radio transmission/reception unit 21, from the radio transmission/reception unit 21. And in accordance with the control of the control signal process unit 24, the user data process unit 25 inputs the obtained user data to either the interface for RNC 22 or the interface for extension transmission/reception server 23.

When receiving an instruction to carry out the transmission/reception by using the extension transmission/reception from the control signal process unit 24, first, the user data process unit 25, converts the IP address of the communication destination MS into the notified IP address of the extension transmission/reception server 30 on the destination IP address of the user data, and encapsulates the user data by using the notified IP address of the extension transmission/reception server 30. Then, the user data process unit 25 inputs the user data to the interface for extension transmission/reception server 23. On the other hand, while the user data process unit 25 does not receive any instruction to carry out the transmission/reception by using the extension transmission/reception from the control signal process unit 24, the user data process unit 25 inputs the user data to the interface for RNC 22. When the destination IP address of the user data is converted, the IP address of the communication destination MS is recorded in the user data.

As described above, the control signal process unit 24 and the user data process unit 25 function as a transmission control unit, which controls transmission of data carried out by the interface for extension transmission/reception server 23 and the interface for RNC 22 based on the data received from the MS 10a. That is, when the data received by the radio transmission/reception unit 21 is the MS control data, the data are input to the interface for RNC 22; and when the data received by the radio transmission/reception unit 21 is the user data, based on the notification of implementation of the transmission/reception of the user data by using the extension transmission/reception, the data is input to the interface for extension transmission/reception server 23.

Further, the user data process unit 25 obtains user data, which are received by the interface for RNC 22 or the interface for extension transmission/reception server 23, from the interface for RNC 22 or the interface for extension transmission/reception server 23, and inputs the data to the radio transmission/reception unit 21. The BS 20b also has the same configuration as that of the BS 20a. In the case of the BS 20b, the radio transmission/reception unit 21 transmits/receives the user data and the control data to/from the MS 10b. Also, the interface for RNC 22 transmits/receives the user data and the control data to/from the RNC 40b.

The extension transmission/reception server 30 transmits/receives user data to be transmitted and received between the MSs 10a and 10b, to/from the BSs 20a and 20b by using the extension transmission/reception, which transmits/receives the data within the radio access network 50. As shown in FIG. 4, the extension transmission/reception server 30 connects to the BSs 20a, 20b, and the RNCs 40a, 40b. The extension transmission/reception server 30 transmits/receives the user data and the extension transmission/reception control data to/from the BSs 20a and 20b. The extension transmission/reception server 30 transmits/receives the extension transmission/reception control data to/from the RNCs 40a and 40b.

Figure 6:
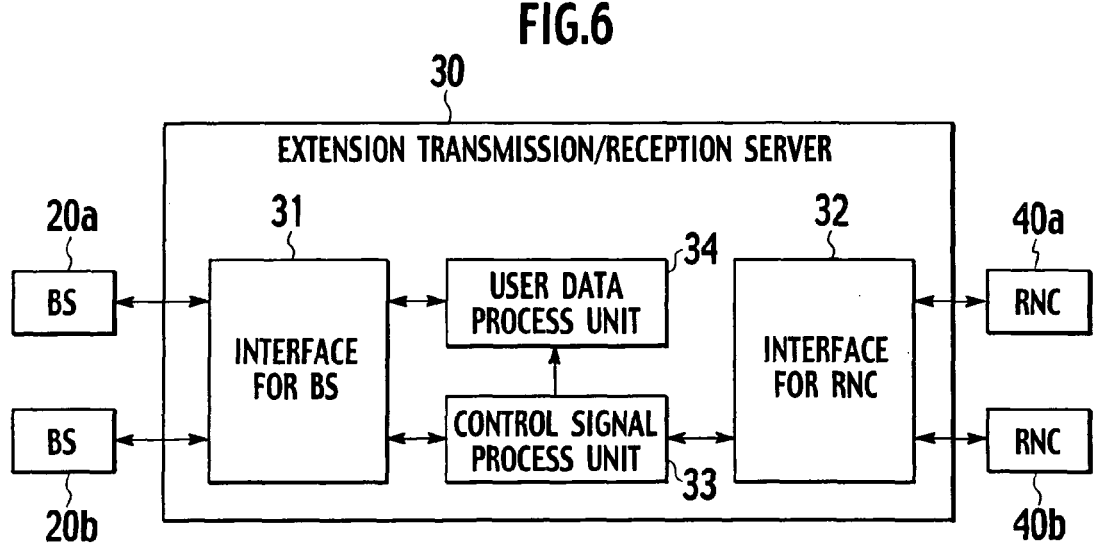
FIG. 6 is a block diagram showing configuration of an extension transmission/reception server in accordance with the first embodiment of the present invention.

As shown in FIG. 6, the extension transmission and reception server 30 includes an interface for BS 31, an interface for RNC 32, a control signal process unit 33 and a user data process unit 34. The interface for BS 31 is a base station transmission/reception unit, which transmits/receives the user data transmitted/received between the MSs 10a and 10b to/from the BSs 20a and 20b by using the extension transmission/reception, which transmits/receives the data within the radio access network 50. The interface for BS 31 transmits/receives the user data and the extension transmission/reception control data to/from the BS 20a and BS 20b. The interface for RNC 32 transmits/receives the extension transmission/reception control data to/from the RNCs 40a and 40b.

The control signal process unit 33 processes the extension transmission/reception control data, which are transmitted/received by the interface for BS 31 and the interface for RNC 32. For example, the control signal process unit 33 obtains the extension transmission/reception control data, which is received by the interface for RNC 32, from the interface for RNC 32. Based on the obtained extension transmission/reception control data, the control signal process unit 33 controls the user data process unit 34. For example, when obtaining a notification of implementation of the transmission/reception by using the extension transmission/reception with respect to the user data transmitted/received between the MSs 10a and 10b, the control signal process unit 33 gives the following instruction to the user data process unit 34. That is, the user data received from the BS 20a connecting to the MS 10a, of which communication source is the MS 10a and the communication destination is the MS 10b, is transmitted to the BS 20b connecting to the MS 10b. Also, the control signal process unit 33 gives the following instruction to the user data process unit 34. That is, the user data received from the BS 20b connecting to the MS 10b, of which communication source is the MS 10b and the communication destination is the MS 10a, is transmitted to the BS 20a connecting to the MS 10a. Thus, the control signal process unit 33 gives an instruction to the user data process unit 34 to transmit/receive the user data by using the extension transmission/reception. Also, the control signal process unit 33 generates the extension transmission/reception control data and inputs the data to the interface for BS 31 and the interface for RNC 32.

The user data process unit 34 controls the transmission/reception of the user data, which is carried out by the interface for BS 31. In accordance with the control of the control signal process unit 33, the user data process unit 34 gives the following instruction to the interface for BS 31. That is, the user data received from the BSs 20a and 20b connecting to the MSs 10a and 10b, which are communication source, is transmitted to the BSs 20b and 20a connecting to the MSs 10b and 10a, which are communication destination. Specifically, the user data process unit 34 obtains the received user data from the interface for BS 31.

When the user data are encapsulated with the IP address of the extension transmission/reception server 30, the user data process unit 34 decapsulates the obtained user data. The user data process unit 34 obtains identification information, which identifies the communication source and communication destination of the decapsulated user data. Also, the user data process unit 34 inputs the decapsulated user data to the interface for BS 31. When the destination IP address of the user data is converted to the IP address of the extension transmission/reception server 30, the user data process unit 34 obtains the IP address of the communication destination MS from the user data, and inverts the obtained destination IP address of the user data to the IP address of the communication destination MS. The user data process unit 34 obtains identification information, which identifies the communication source and communication destination of the inverted user data. Further, the user data process unit 34 inputs the inverted user data to the interface for BS 31.

Based on the identification information of the communication source and communication destination of the obtained user data and the instruction from the control signal process unit 33, the user data process unit 34 determines the BS to which the received user data is transmitted. Based on the determination result, the user data process unit 34 gives an instruction to the interface for BS 31 about the BS, which transmits the user data. Identification information includes, for example, IP address of the MSs 10a and 10b, user ID of the users by using the MS 10a and 10b, mobile station ID and the like.

The RNCs 40a and 40b control the radio communication, which is carried out between the MSs 10a, 10b and the BSs 20a, 20b. As shown in FIG. 4, the RNCs 40a and 40b are connecting to the extension transmission/reception server 30 and the MSC 60. The RNCs 40a and 40b connect to the BSs 20a and 20b respectively. Each of the RNCs 40a and 40b transmits/receives the user data and the control data between the MSC 60 and each of the BSs 20a and 20b. Also, the RNCs 40a and 40b transmit/receive the extension transmission/reception control data to/from the extension transmission/reception server 30. A plurality of RNCs may be disposed with respect to a single MSC 60.

Figure 7:
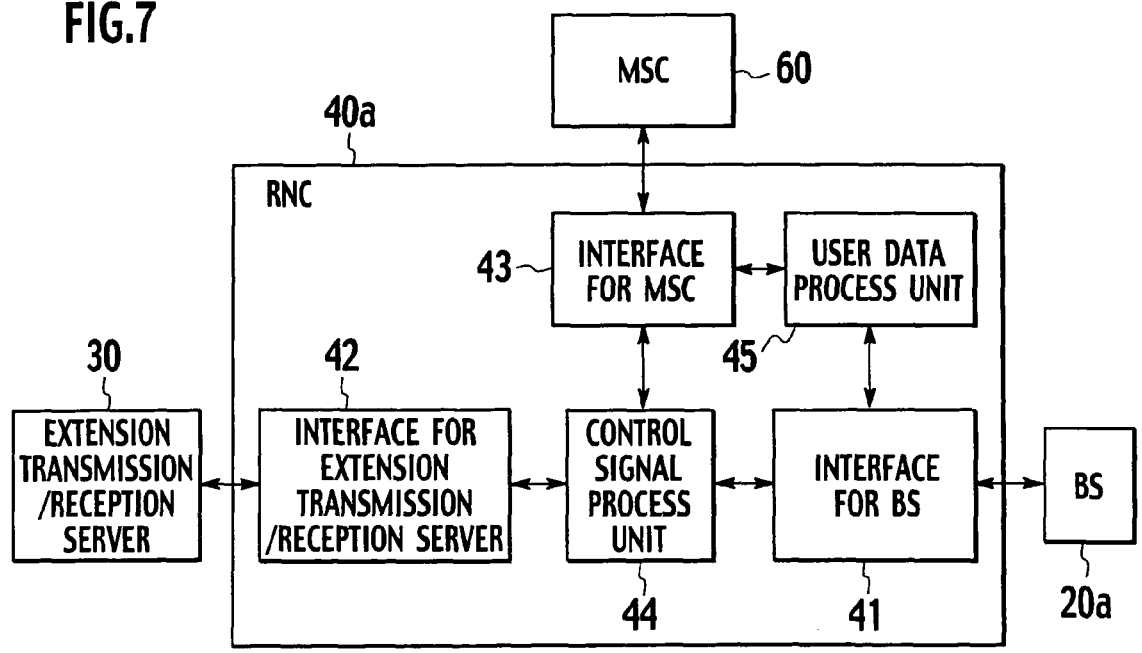
FIG. 7 is a block diagram showing configuration of a radio network controller in accordance with the first embodiment of the present invention.

As shown in FIG. 7, the RNC 40a includes an interface for BS 41, an interface for extension transmission/reception server 42, an interface for MSC 43, a control signal process unit 44 and a user data process unit 45. The interface for BS 41 transmits/receives the user data and the control data to/from the BS 20a. The interface for extension transmission/reception server 42 transmits/receives extension transmission/reception control data to/from the extension transmission/reception server 30. The interface for MSC 43 transmits/receives the user data and the control data to/from the MSC 60.

The control signal process unit 44 processes the control data, which are transmitted/received among the interface for BS 41, the interface for extension transmission/reception server 42 and the interface for MSC 43. Specifically, the control signal process unit 44 obtains the control data, which are received by the interface for BS 41, from the interface for BS 41, and inputs the data to the interface for MSC 43. The control signal process unit 44 obtains the extension transmission/reception control data, which are received by the interface for extension transmission/reception control server 42, from the interface for extension transmission/reception server 42, and inputs the data to the interface for MSC 43.

The control signal process unit 44 obtains the MS control data, which are received by the interface for MSC 43, and the extension transmission/reception control data for the BS 20a from the interface for MSC 43, and inputs the data to interface for BS 41. Also, the control signal process unit 44 obtains the extension transmission/reception control data for the extension transmission/reception server 30, which are received by the interface for MSC 43, from the interface for MSC 43, and inputs the data to the interface for extension transmission/reception server 42.

Also, the control signal process unit 44 functions as the communication control unit, which controls the radio communication carried out between the MS 10a and the BS 20a. The control signal process unit 44 controls the BS 20a to control the radio communication. Specifically, the control signal process unit 44 assigns a radio channel for transmitting/receiving the data between the MS 10a and the BS 20a. The control signal process unit 44 manages the usage status of the assignment of the radio channel and the radio resources. Also, the control signal process unit 44 controls the hand-over and the like. The control signal process unit 44 transmits/receives information relating to the control of the radio communication such as information with respect to the assignment of the radio channel, as the control data to/from the BS 20a via the interface for BS 41. Also, when a plurality of BSs connect to the RNC 40a, the control signal process unit 44 controls the radio communication carried out by the plurality of BSs.

The user data process unit 45 processes the user data to be transmitted/received between the interface for BS 41 and the interface for MSC 43. Specifically, the user data process unit 45 obtains the user data, which are received by the interface for BS 41, from the interface for BS 41, and inputs the data to the interface for MSC 43. Also, the user data process unit 45 obtains the user data, which are received by the interface for MSC 43, from the interface for MSC 43, and input the data to the interface for BS 41.

The RNC 40b also has the same configuration as that of the RNC 40a. In the case of the RNC 40b, the interface for BS 41 transmits/receives the user data and the control data to/from the BS 20b. Also, the control signal process unit 44 controls the BS 20b, and thereby controls the radio communication carried out between the MS 10b and the BS 20b.

The MSC 60 transmits/receives the user data and the control data, which are transmitted/received between the MSs 10a and 10b, in the core network 80. Also, the MSC 60 functions as an extension transmission/reception controller, which determines whether or not the user data to be transmitted/received between the MSs 10a and 10b is transmitted/received by using the extension transmission/reception, which transmits/receives the data within the radio access network 50, and controls the extension transmission/reception. The HLR 70 includes a subscriber information database storing subscriber information. As shown in FIG. 4, the MSC 60 connects to the RNCs 40a, 40b and the HLR 70. The MSC 60 transmits/receives the user data and the control data to/from the RNCs 40a and 40b. Also, the MSC 60 refers to subscriber information stored in the HLR 70. The MSC 60 may connect to another MSC or a network other than the radio access network 50 and the core network 80. The HLR 70 connects to the MSC 60.

As shown in FIG. 8, the MSC 60 includes an interface for RNC 61, an interface for HLR 62, a control signal process unit 63, a user data process unit 64, a connection information database 65, and an extension transmission/reception determination unit 66.

The connection information database 65 stores connection information relating to extension transmission/reception servers, which is capable of transmitting/receiving the user data to/from the BS. As shown in FIG. 9, the connection information database 65 stores the relationship with the BS and the extension transmission/reception server, which connects to the BS, as connection information. The connection information database 65 has a field for storing the BS name, a field for storing the name of the extension transmission/reception server, which connects to the BS, and a field for storing the IP address of the extension transmission/reception server. The connection information database 65 stores the BS name, name of the extension transmission/reception server, which connects to the BS and the IP address of the extension transmission/reception server while associating the same with each other. The BS name and the name of the extension transmission/reception server are the name for identifying the BS and the extension transmission/reception server.

In FIG. 9, numerals "01"-"04" are used for representing the BS name and the name of the extension transmission/reception server. If the identification information uniquely identifies the BS and the extension transmission/reception server, the BS name and the name of the extension transmission/reception server are not specifically limited. When there is no extension transmission/reception server, which connects to the BS, the name of the extension transmission/reception server is stored as "Null" in the field thereof. The BS name of the BS 20a is "BS01", the BS name of the BS 20b is "BS02", and the name of the extension transmission/reception server of the extension transmission/reception server 30 is "server 01". Therefore, according to connection information, it can be recognized that the extension transmission/reception server, which connects to the BSs 20a and 20b is the extension transmission/reception server 30, and the IP address thereof is "255.255.255.3".

As described above, according to connection information, not only the extension transmission/reception server, which connects to the BS, can be uniquely identified, but also IP address of the extension transmission/reception server can be recognized. Here, extension transmission/reception server, which connects to the BS means an extension transmission/reception server, which is capable of transmitting/receiving the user data to/from the BS. Accordingly, not only the case where no extension transmission/reception server connecting to the BS is provided, but also the case where an extension transmission/reception server connecting to the BS is not available due to some trouble, it is determined as no extension transmission/reception server connecting to the BS is provided. In accordance with connection information, it is possible to determine whether or not an extension transmission/reception server, which is capable of transmitting/receiving the user data to/from the BS. There may be a case where the radio access network has no extension transmission and reception server.

The extension transmission/reception determination unit 66 determines whether or not the user data is transmitted/received by using the extension transmission/reception. When it is determined that the user data is transmitted/received by using the extension transmission/reception, the extension transmission/reception determination unit 66 selects an extension transmission/reception server to be used for the extension transmission/reception. That is, the extension transmission/reception determination unit 66 selects an extension transmission/reception server with which the BS transmits/receives the user data.

Based on the determination information, the extension transmission/reception determination unit 66 determines whether or not the user data is transmitted/received by using the extension transmission/reception, and selects an extension transmission/reception server used for the extension transmission/reception. The extension transmission/reception determination unit 66 uses the existence or absence of the extension transmission/reception server, which is capable of transmitting/receiving the user data to/from the BS, as determination information. Specifically, the extension transmission/reception determination unit 66 obtains identification information of the BS to which the communication source MS requesting to transmit the user data is connected, and identification information of the BS to which the communication destination MS is connected, from the control signal process unit 63. The extension transmission/reception determination unit 66 refers to the connection information database 65. And, based on the obtained identification information of the BS, the extension transmission/reception determination unit 66 retrieves the connection information database 65, and determines whether or not there are any extension transmission/reception server connecting to the BS.

When it is determined that either of the extension transmission/reception server connecting to the BS to which the communication source MS is connected, or the extension transmission/reception server connecting to the BS to which the communication destination MS is connected does not exist, the extension transmission/reception determination unit 66 determines not to carry out the transmission/reception of the user data by using the extension transmission/reception. And in this case, the extension transmission/reception determination unit 66 determines to carry out the transmission/reception of the user data via the MSC 60.

On the other hand, when it is determined that there exist both of the extension transmission/reception server connecting to the BS to which the communication source MS is connected, and the extension transmission/reception server connecting to the BS to which the communication destination MS is connected, the extension transmission/reception determination unit 66 determines to carry out the transmission/reception of the user data by using the extension transmission/reception. And the extension transmission/reception determination unit 66 selects the extension transmission/reception server, which is used for extension transmission and reception. When there exist a plurality of extension transmission/reception servers connecting to the BS, the extension transmission/reception server can be selected based on the traffic load and the process capacity.

Then, the extension transmission/reception determination unit 66 obtains the IP address of the selected extension transmission/reception server. The extension transmission/reception determination unit 66 inputs the determination result to the control signal process unit 63. The determination result includes not only whether or not the transmission/reception of the user data by using the extension transmission/reception is carried out, but also a determination that transmission/reception of the user data via the MSC 60 is carried out, and the IP address of the selected extension transmission/reception server, and so on.

The interface for RNC 61 transmits/receives the user data and the control data to/from the RNCs 40a and 40b. The interface for RNC 61 transmits the determination result made by the extension transmission/reception determination unit 66 as the extension transmission/reception control data, and functions as a determination result transmission unit, which transmits the determination result. The interface for RNC 61 transmits the determination result to the BS to which the communication source MS requesting for the transmission of the user data is connected, the BS to which the communication destination MS is connected and the extension transmission/reception server via the RNCs 40a and 40b.

The control signal process unit 63 processes the control data transmitted/received by the interface for RNC 61. Specifically, the control signal process unit 63 obtains identification information that identifies the communication destination of the MS control data, which are received by the interface for RNC 61. The control signal process unit 63 gives an instruction to the interface for HLR 62 to notify identification information of the communication destination and to provide subscriber information of the communication destination MS. And the control signal process unit 63 obtains identification information of the BS to which the communication destination MS is connect, as subscriber information from the interface for HLR 62. Based on the obtained identification information of the BS, the control signal process unit 63 gives an instruction to the interface for RNC 61 to transmit the received MS control data to the RNC connecting to the BS corresponding to obtained identification information. The control signal process unit 63 maintains the connection relationship between the BS and the RNC in advance.

Further, when the MS control data is the call request that the MS requests for the transmission of the user data, the control signal process unit 63 obtains identification information that identifies the communication source and the communication destination of the call request. The control signal process unit 63 notifies the interface for HLR 62 of identification information of the communication source and the communication destination, and gives an instruction to the interface 62 to provide subscriber information of the communication source MS and communication destination MS. And the control signal process unit 63 obtains identification information of the BSs connecting to the communication source MS and communication destination MS as subscriber information from the interface for HLR 62.

The control signal process unit 63 inputs identification information of the BSs connecting to the communication source MS and communication destination MS to the extension transmission/reception determination unit 66. And the control signal process unit 63 obtains the determination result from the extension transmission/reception determination unit 66. The control signal process unit 63 inputs the obtained determination result to the interface for RNC 61, and gives an instruction via the RNCs 40a and 40b to the BS connecting to the communication source MS of the call request, the BS connecting to the communication destination MS and the extension transmission/reception server to transmit the determination result.

The user data process unit 64 processes the user data transmitted/received by the interface for RNC 61. Specifically, the user data process unit 64 obtains identification information that identifies the communication destination of the user data, which is received by the interface for RNC 61. The user data process unit 64 notifies the interface for HLR 62 of identification information of the communication destination, and gives an instruction to the interface 62 to provide subscriber information of the communication destination MS. And the user data process unit 64 obtains identification information of the BS connecting to the communication destination MS, as subscriber information from the interface for HLR 62. Based on the obtained identification information of the BS, the user data process unit 64 gives an instruction to the interface for RNC 61 to transmit the received user data to the RNC connecting to the obtained BS.

The interface for HLR 62 refers to the HLR 70 in accordance with the control of the control signal process unit 63 and the user data process unit 64. Specifically, the interface for HLR 62 receives the notification of identification information of the MS from the control signal process unit 63 and the user data process unit 64. The interface for HLR 62 transmits a request for subscriber information to the HLR 70. The request for subscriber information includes identification information of the notified MS. And the interface for HLR 62 receives subscriber information to the request from the HLR 70. The interface for HLR 62 receives, for example, identification information and the like of the BS connecting to the MS, as subscriber information. The interface for HLR 62 inputs obtained subscriber information to the control signal process unit 63 and the user data process unit 64.

As shown in FIG. 10, the HLR 70 includes an interface for MSC 71 and a subscriber information database 72. The subscriber information database 72 stores subscriber information. The subscriber information database 72 stores information for the communication such as location registration information, which is the relationship between the MS and the BS connecting to the MS, and authentication information of the MS, as subscriber information. The MS and the BS connecting to the MS may be associated with each other by using, for example, identification information of the MS and BS.

The interface for MSC 71 provides subscriber information to the MSC 60 in accordance with the request from the MSC 60. Specifically, the interface for MSC 71 receives a request for subscriber information including identification information of the MS from the MSC 60. Based on the identification information of the MS, the interface for MSC 71 retrieves the subscriber information database 72 to obtain corresponding to subscriber information. The interface for MSC 71 obtains, for example, identification information of the BS connecting to the MS as the subscriber information. The interface for MSC 71 transmits the obtained subscriber information to the MSC 60.

The mobile communication system 100 is capable of performing connectionless communication. Accordingly, every device; i.e., the MSs 10a and 10b, the BSs 20a and 20b, the extension transmission/reception server 30, the RNCs 40a and 40b, the MSC 60 and the HLR 70 are capable of transmitting/receiving data by connectionless communication. As a result, the mobile communication system 100 can be provided and extended easily. Further, when a trouble occurs on the communication path or device itself, the mobile communication system 100 can make a detour the troubled portion easily resulting in an increased reliability. Further, every device, i.e., the MSs 10a and 10b, the BSs 20a and 20b, the extension transmission/reception server 30, the RNCs 40a and 40b, the MSC 60 and the HLR 70 is capable of transmitting/receiving the control data as the control signal.

(Communication Method)

Figure 11:
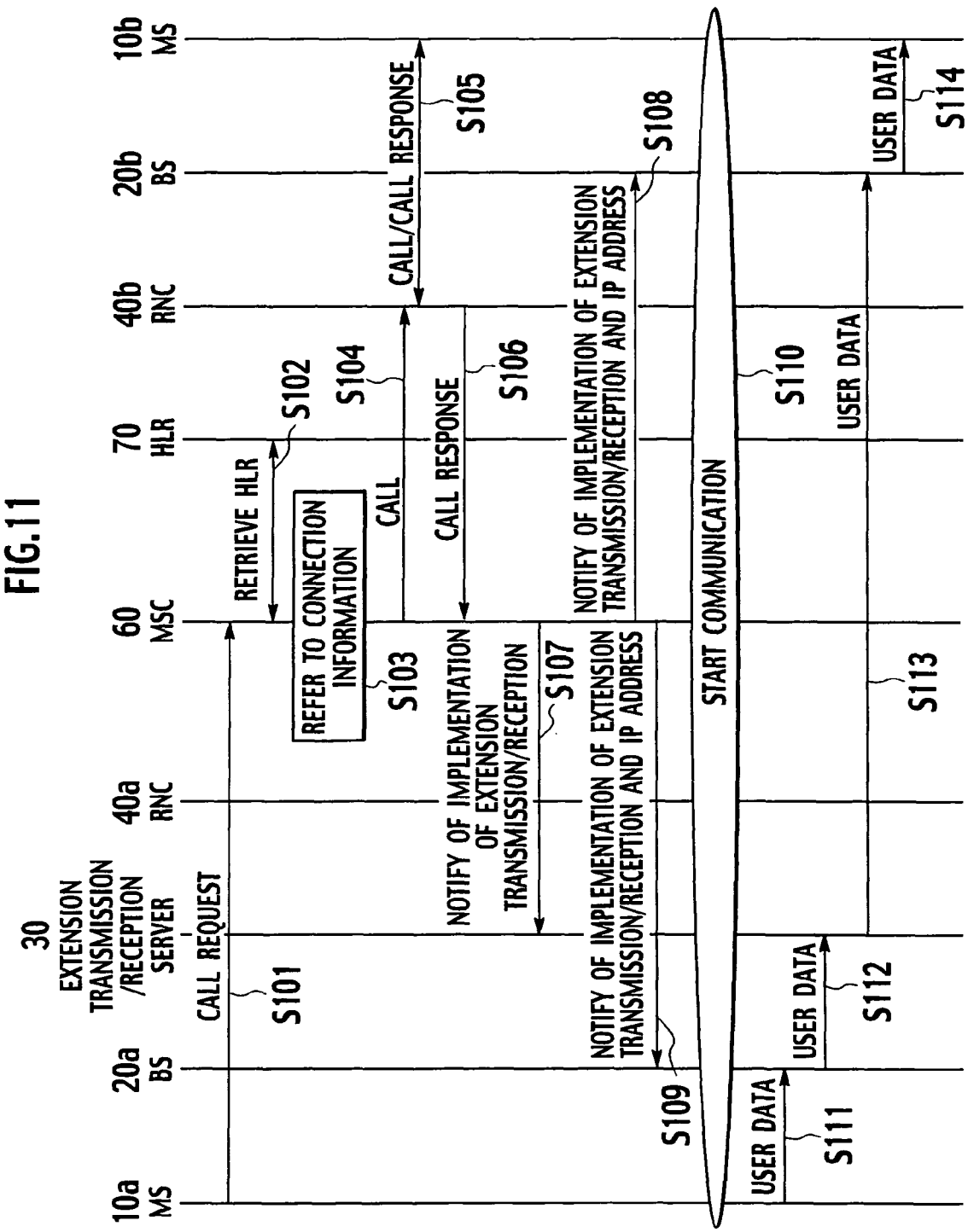
FIG. 11 is a flow chart showing a procedure of the communication method in accordance with the first embodiment of the present invention.

Referring to FIG. 11, the communication method with the mobile communication system 100, will be described. First, the MS 10a transmits a call request requesting for a transmission of user data to the MS 10b, to the MSC 60 via the BS 20a and the RNC 40a (S101). The MSC 60 retrieves the HLR 70. In other words, the MSC 60 refers to the HLR 70, and obtains identification information of the BSs 20a and 20b to which the MS 10a (communication source MS) and the MS 10b (communication destination MS) connect respectively, as subscriber information from location registration information (S102). According to this, the MSC 60 detects that each of the MSs 10a and 10b connects to the BSs 20a and 20b respectively.

Based on the identification information of the BSs 20a and 20b, the MSC 60 refers to connection information of the BSs 20a and 20b. According to this, the MSC 60 detects that the BS 20a connecting to the MS 10a connects to the extension transmission/reception server 30; and the BS 20b connecting to the MS 10b connects to the extension transmission/reception server 30. Since there exist the extension transmission/reception server 30 to which connects both of BSs 20a and 20b, the MSC 60 determines to carry out the transmission/reception of the user data by using the extension transmission/reception, and selects the extension transmission/reception server 30 as the extension transmission/reception server to be used for the extension transmission/reception (S103).

Then, the MSC 60 gives an instruction to the RNC 40b to call the MS 10b (S104). Receiving the instruction, the RNC 40b calls the MS 10b, and the MS 10b responses to the call (S105). The RNC 40b notifies the MSC 60 of reception of call response (S106). Receiving the call response, the MSC 60 notifies the extension transmission/reception server 30 of the implementation of the transmission/reception of the user data transmitted/received between the MSs 10a and 10b by using the extension transmission/reception (S107). Further, the MSC 60 notifies the BS 20b connecting to the MS 10b (communication destination MS) and the BS 20a connecting to the MS 10a (communication source MS) of implementation of the transmission/reception of the user data transmitted/received between the MSs 10a and 10b by using the extension transmission/reception, and the IP address of the extension transmission/reception server 30, which is used for the extension transmission/reception (S108), (S109).

According to the above-described process, the communication is started between the MS 10a and the MS 10b (S110). After the communication has been started, the MS 10a (communication source MS) transmits the user data to the BS 20a (S111). The BS 20a converts the destination IP address in the user data received from the MS 10a into the IP address of the extension transmission/reception server 30, or encapsulates the received user data with the IP address of the extension transmission/reception server 30 to transmit the data to the extension transmission/reception server 30 (S112). The extension transmission/reception server 30 inverts the destination IP address of the user data received from the BS 20a to IP address of the communication destination MS 10b, or decapsulates the received user data to transmit the data directly to the BS 20b by using the extension transmission/ reception (S113). In step (S113), the user data are transmitted/received without using the RNC 40*a*, the RNC 40*b* and the MSC 60. The BS 20*b* transmits the received user data to the MS 10*b* (S114).

Figure 12:
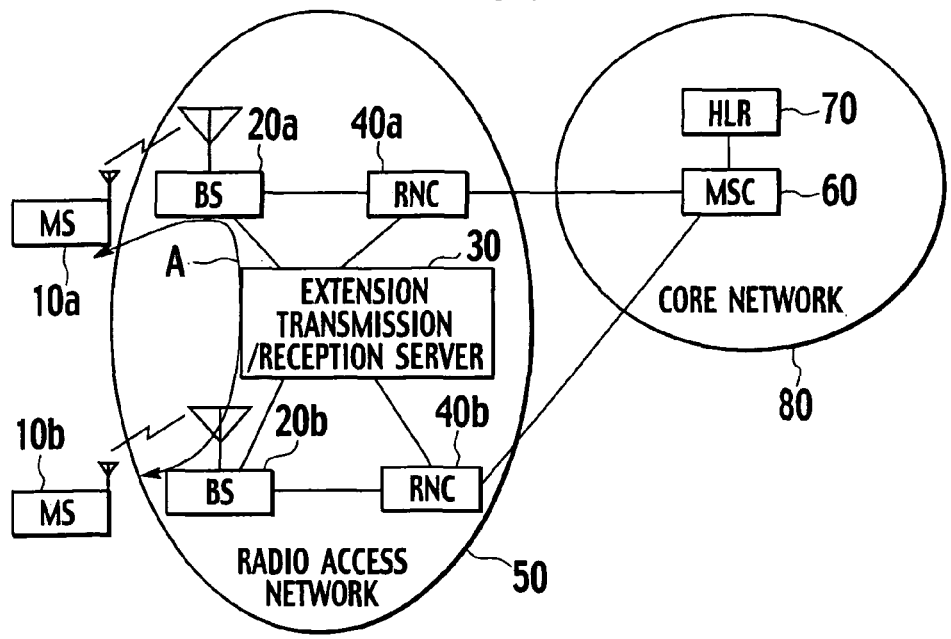
FIG. 12 is a view showing paths for user data in accordance with the first embodiment of the present invention.

Accordingly, in the mobile communication system 100, when the user data are transmitted/received by using the extension transmission/reception, the path A of the user data is resulted in as shown in FIG. 12. The user data are, without using the MSC 60, transmitted/received through the path A, which goes through the MS 10*a*, the BS 20*a*, the extension transmission and reception server 30 and the BS 20*b* to the MS 10*b*. That is, the BS 20*a* (communication source BS) connecting to the MS 10*a* (communication source MS), which transmits the user data, receives the transmitted user data from the MS 10*a* (communication source MS), and transmits the user data to the extension transmission/reception server 30 without using the MSC 60. The extension transmission/reception server 30 receives the user data from the BS 20*a* (communication source BS), and transmits the user data to the BS 20*b* (communication destination BS) connecting to the MS 10*b* (communication destination MS), which receives the user data. And the BS 20*b* (communication destination BS) receives the user data from the extension transmission/reception server 30, and transmits the data to the MS 10*b* (communication destination MS). Accordingly, the data transmitted from the MS 10*a* (communication source MS) reaches the MS 10*b* (communication destination MS) trough the path A in the radio access network 50.

After the communication has been started in step (S110), the BSs 20*a* and 20*b* transmit/receive the MS control data, which are transmitted/received between the MSs 10*a* and 10*b*, via the MSC 60. Accordingly, the MS control data transmitted/received between the MSs 10*a* and 10*b*, is transmitted/received via the MSC 60. That is, the MS control data are transmitted/received through the path, which goes through the MS 10*a*, the BS 20*a*, the RNC 40*a*, the MSC 60, the RNC 40*b* and the BS 20*b* to the MS 10*b*.

According to the above-described mobile communication system 100, the BSs 20*a* and 20*b*, the extension transmission/reception server 30, the MSC 60 and the communication method thereof, the user data can be transmitted/received among the extension transmission/reception server 30 and BSs 20*a* and 20*b* by using the extension transmission/reception. Specifically, the interface for BS 31 in the extension transmission/reception server 30 transmits/receives the user data between the BSs 20*a* and 20*b* by using the extension transmission/reception, and the interface for extension transmission/reception server 23 in the BSs 20*a* and 20*b* transmits/receives the user data with the extension transmission/reception server 30 by using the extension transmission/reception.

Therefore, in the mobile communication system 100, the user data can be transmitted/received without using the MSC 60, which is located outside the radio access network 50. Ordinarily, in many cases, in order to integrate the functions, the MSC 60 is located in a place away from the BSs 20*a* and 20*b*. In the mobile communication system 100, since the MSC 60 is not used, the user data can be transmitted/received in a place near the BSs 20*a* and 20*b*. Accordingly, in the mobile communication system 100, the path for the user data can be shortened as shown in FIG. 12. As a result, in the mobile communication system 100, the line use fee for the path, which goes through the MSC 60, can be reduced, and the delay due to the path can be reduced. Also, it is not necessary to lay a lot of lines, which are necessary for allowing every user data to go through the redundant path including the MSC 60.

Further, the BSs 20*a* and 20*b* transmit/receive the MS control data via the MSC 60. Therefore, the MS control data transmitted/received between the MSs 10*a* and 10*b* are transmitted/received via the MSC 60. Accordingly, in the mobile communication system 100, the function to integrally process the control data, which is originally given to the MSC 60, an integration effect can be obtained. Also, in the mobile communication system 100, distribution MSC and integration MSC are not provided, but the MSC 60 is provided. Accordingly, it is possible to prevent the function of the mobile communication system 100 from becoming redundant. Therefore, the cost for redundant portion can be saved.

Further, the BSs 20*a* and 20*b* includes an interface for RNC 22 that functions as the control data transmission/reception unit, an interface for extension transmission/reception server 23 that functions as the user data transmission/reception unit, a control signal process unit 24 that functions as the transmission control unit for controlling the data transmission carried out by the user data transmission/reception unit and the control data transmission/reception unit based on the data received from the MS and the user data process unit 25. Accordingly, when the data received from the MSs 10*a* and 10*b* are the user data, the BSs 20*a* and 20*b* can control by using the interface for extension transmission/reception server 23 so that the user data is transmitted by using the extension transmission/reception. On the other hand, when the data received from the MSs 10*a* and 10*b* are the MS control data, the BSs 20*a* and 20*b* can control by using the interface for RNC 22 so that the MS control data are transmitted via the MSC 60.

As a result, the BSs 20*a* and 20*b* can transmit/receive the user data by using the extension transmission/reception, and transmit/receive the MS control data via the MSC 60. Accordingly, the BSs 20*a* and 20*b* can shorten the path for the user data, and make use of the function to integrally process the MS control data, which is originally give to the MSC 60.

Further, the mobile communication system 100 and the MSC 60 includes the extension transmission/reception determination unit 66, which determines whether or not the user data is transmitted/received by using the extension transmission/reception. According to this, mobile communication system 100 does not use the extension transmission/reception uniformly for transmitting/receiving the user data, but can use the extension transmission/reception depending on the conditions.

Particularly, when the extension transmission/reception determination unit 60 determines based on the existence or absence of the extension transmission/reception server, which is capable of transmitting/receiving the user data with the BS, it can be determined whether or not the extension transmission/reception is used based on the conditions in the mobile communication system 100 at the point when the user data are transmitted/received, such as, for example, no extension transmission/reception server connecting to the BS is available; or an extension transmission/reception server connecting to the BS has a trouble. Furthermore, the extension transmission/reception determination unit 66 can select the extension transmission/reception server to be used for the extension transmission/reception at the point when it is determined whether or not that the user data is transmitted/received by using the extension transmission/reception.

Accordingly, the mobile communication system 100 can flexibly use the extension transmission/reception, the transmission/reception via the MSC 60, and the extension transmission/reception server 30 to be used, in accordance with the conditions in the mobile communication system 100 at the point when the user data is transmitted/received. As a result, the mobile communication system 100 can flexibly cope with, for example, a trouble of the extension transmission/reception server or the like.

Embodiment 2

Mobile Communication System

Figure 13:
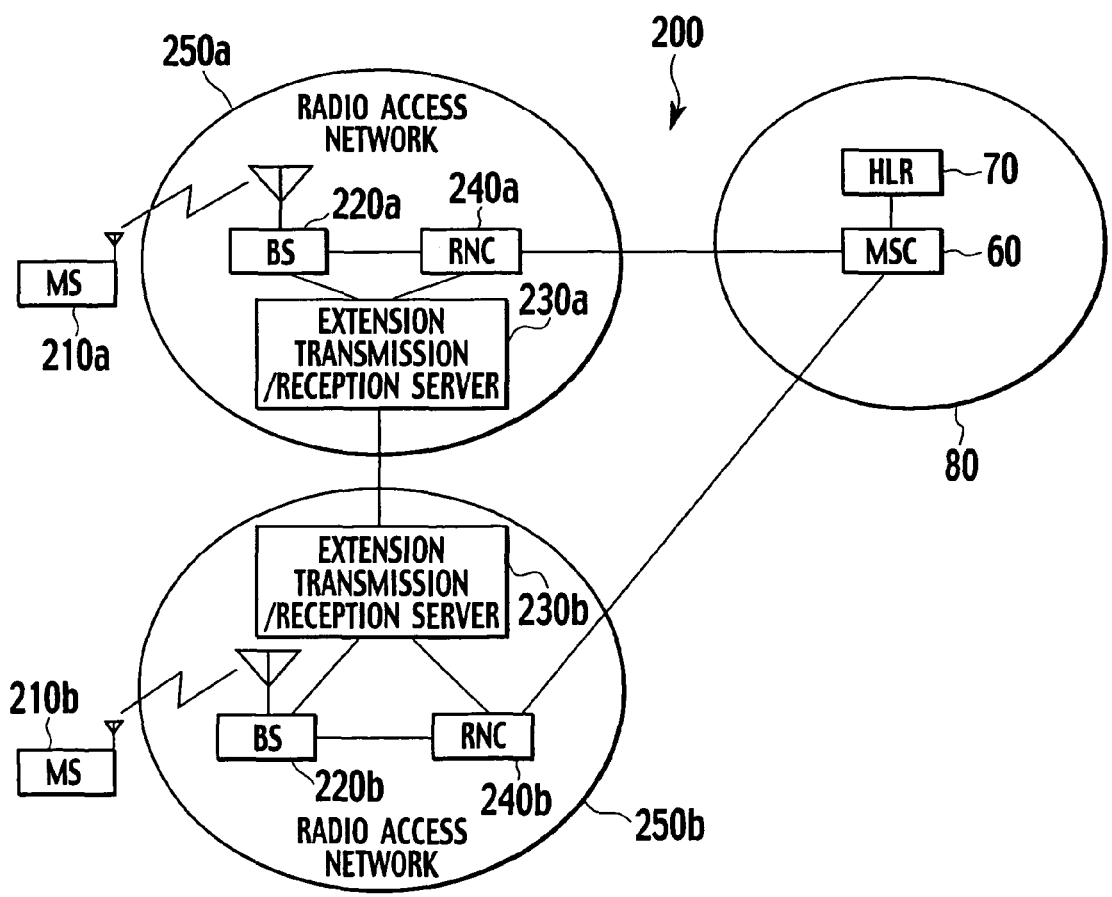
FIG. 13 is a view showing configuration of a mobile communication system in accordance with a second embodiment of the present invention.

As shown in FIG. 13, a mobile communication system 200 includes a plurality of MSs 210a and 210b, a plurality of radio access networks 250a and 250b and a core network 80. In the mobile communication system 200, the plurality of radio access networks 250a and 250b form a radio access network in the mobile communication system 200. The radio access network 250a includes a BS 220a, an extension transmission/reception server 230a and an RNC 240a. The radio access network 250b includes a BS 220b, an extension transmission/reception server 230b and an RNC 240b. The MSs 210a and 210b, the RNCs 240a and 240b and the HLR 70 are substantially the same as the MSs 10a and 10b, the RNCs 40a and 40b and the HLR 70 shown in FIG. 4.

The extension transmission/reception servers 230a and 230b transmit/receive user data to be transmitted/received between the MSs 210a and 210b, to/from the BSs 220a and 220b respectively by using the extension transmission/reception, which transmits/receives the data within the radio access networks 250. The extension transmission/reception server 230a connects to the BS 220a, the RNC 240a and the extension transmission/reception server 230b. The extension transmission/reception server 230b connects to the BS 220b, the RNC 240b and the extension transmission/reception server 230a. The extension transmission/reception servers 230a and 230b transmit/receive the user data and the extension transmission/reception control data to/from the BSs 220a and 220b. The extension transmission/reception servers 230a and 230b transmit/receive extension transmission/reception control data to/from the RNCs 240a and 240b respectively. Further, the extension transmission and reception server 230a transmits/receives the user data and the extension transmission/reception control data to/from the extension transmission/reception server 230b. And the extension transmission/reception server 230b transmits/receives the user data and the extension transmission/reception control data with the extension transmission/reception server 230a.

Figures 14, 15:
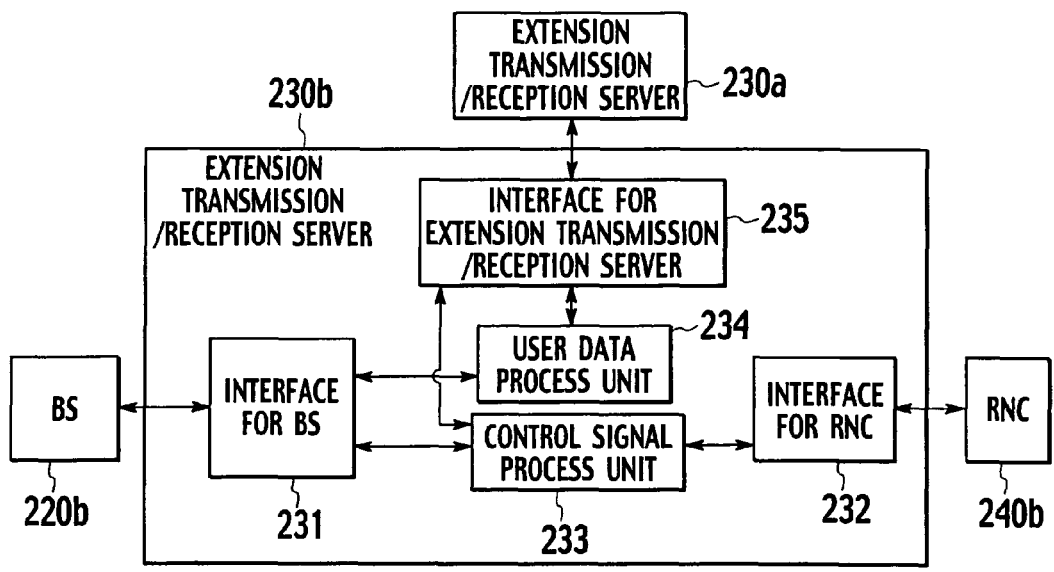
FIG. 14 is a block diagram showing configuration of an extension transmission/reception server in accordance with the second embodiment of the present invention.
FIG. 15 is a view showing traffic load and extension traffic threshold in accordance with the second embodiment of the present invention.

As shown in FIG. 14, the extension transmission/reception server 230b includes an interface for BS 231, an interface for RNC 232, a control signal process unit 233, a user data process unit 234 and an interface for extension transmission/reception server 235.

The interface for extension transmission/reception server 235 is the extension transmission/reception unit, which transmits/receives the user data to be transmitted/received between the MSs 210a and 210b, to/from another extension transmission/reception server 230a by using the extension transmission/reception, which transmits/receives the data within the radio access networks 250a and 250b. The "extension transmission/reception" means to transmit/receive the data within the radio access networks 250a and 250b. Accordingly, the extension transmission/reception includes a mode as shown in FIG. 13, in which the data are transmitted/received within a radio access network including a plurality of radio access networks 250a and 250b. In such extension transmission/reception, the data transmission/reception is carried out over the plurality of radio access networks 250a and 250b forming the radio access network of the mobile communication system 200.

The interface for extension transmission/reception server 235 transmits/receives the user data and the extension reception/reception control data with the extension transmission/reception server 230a. The interface for BS 231 is the base station reception/reception unit. The interface for BS 231 transmits/receives the user data and the extension reception/reception control data with the BS 220b. The interface for RNC 232 transmits/receives the extension transmission/reception control data with the RNC 240b.

The control signal process unit 233 processes the extension transmission/reception control data, which are transmitted/received among the interface for BS 231, the interface for RNC 232 and the interface for extension transmission/reception server 235. For example, the control signal process unit 233 obtains the extension transmission/reception control data, which are received by the interface for RNC 232, from the interface for RNC 232. Based on the obtained extension transmission/reception control data, the control signal process unit 233 controls the user data process unit 234.

For example, with respect to the user data to be transmitted/received between the MSs 210a and 210b, when the control signal process unit 233 obtains a notification of implementation of the transmission/reception by using the extension transmission/reception, and the IP address of the extension transmission/reception server 230a, which is a communication destination extension transmission/reception server, the control signal process unit 233 gives an instruction to the user data process unit 234 to transmit the user data, which are received from the extension transmission/reception server 230a and of which communication source is the MS 210a and the communication destination is the MS 210b, to the BS 220b connecting to the MS 210b.

Also, when the control signal process unit 233 obtains the user data, which are received from the BS 220b and of which communication source is the MS 210b and the communication destination is the MS 210a, the control signal process unit 233 gives an instruction to the user data process unit 234 to transmit to the extension transmission/reception server 230a. As described above, the control signal process unit 233 gives an instruction to the user data process unit 234 to transmit/receive the user data by using the extension transmission/reception. Further, the control signal process unit 233 generates the extension transmission/reception control data, and inputs the data to the interface for BS 231, the interface for RNC 232 and the interface for extension transmission/reception server 235.

The user data process unit 234 controls the transmission/reception of the user data, which are carried out by the interface for extension transmission/reception server 235 and the interface for BS 231. In accordance with the control of the control signal process unit 233, the user data process unit 234 gives an instruction to the interface for extension transmission/reception server 235 to transmit the user data, which are received from the BS 220b connecting to the source MS 210b (communication source MS), to the extension transmission/reception server 230a. Specifically, the user data process unit 234 obtains the received user data from the interface for BS 231.

When the user data are encapsulated with the IP address of the extension transmission/reception server 230b, the user data process unit 234 decapsulates the obtained user data. The user data process unit 234 obtains identification information for identifying the communication source and the communication destination of the decapsulated user data. When the destination IP address of the user data is converted into the IP address of the extension transmission/reception server 230b, the user data process unit 234 obtains the IP address of the MS 210*a* (communication destination MS) from the user data, and inverts the destination IP address of the obtained user data to the IP address of the MS 210*a* (communication destination MS). The user data process unit 234 obtains the identification information for identifying the communication source and the communication destination of the inverted user data.

Based on the identification information of the communication source and the communication destination of the obtained user data and the instruction from the control signal process unit 233, the user data process unit 234 determines that the communication destination to which the received user data is transmitted, is the extension transmission/reception server 230*a*. And based on the determination result, the user data process unit 233 gives an instruction to the interface for extension transmission/reception server 235 to transmit the user data to the extension transmission/reception server 230*a*. At this time, the user data process unit 234 converts the destination IP address of the user data from the IP address of the MS 210*a* (communication destination MS) to the IP address of the notified extension transmission/reception server 230*a*. Or, the user data process unit 234 encapsulates the user data with the IP address of the notified extension transmission/reception server 230*a*. Then, the user data process unit 234 inputs the user data to the interface for extension transmission/reception server 235. When the user data process unit 234 converts the destination IP address of the user data, the user data process unit 234 records the IP address of the MS 210*a* (communication destination MS) in the user data.

Also, in accordance with the control of the control signal process unit 233, the user data process unit 234 gives an instruction to the interface for BS 231 to transmit the user data, which is received from the extension transmission/reception server 230*a*, to the BS 220*b*. Specifically, the user data process unit 234 obtains the user data, which is received from the interface for extension transmission/reception server 235.

When the user data is encapsulated with the IP address of the extension transmission/reception server 230*b*, the user data process unit 234 decapsulates the obtained user data. The user data process unit 234 obtains identification information for identifying the communication source and the communication destination of the decapsulated user data. When the destination IP address of the user data is converted to the IP address of the extension transmission/reception server 230*b*, the user data process unit 234 obtains the IP address of the MS 210*a* (communication destination MS) from the user data, and inverts the communication destination IP address of the obtained user data to the IP address of the MS 210*a* (communication destination MS). The user data process unit 234 obtains the identification information for identifying the communication source and the communication destination of the inverted user data.

Based on the obtained identification information of the communication source and the communication destination of the user data and the instruction from the control signal process unit 233, the user data process unit 234 determines that the communication destination, to which the received user data is transmitted, is the BS 220*b* connecting to the MS 210*b* (communication destination MS). And based on the determination result, the user data process unit 233 gives an instruction to the interface for BS 231 to transmit the user data to the BS 220*b*.

The extension transmission/reception server 230*a* also has the same configuration as that of the extension transmission/reception server 230*b*. In the extension transmission/reception server 230*a*, the interface for BS 231 transmits/receives the user data and the extension transmission/reception control data to/from the BS 220*a*. The interface for RNC 232 transmits/receives the extension transmission/reception control data to/from the RNC 240*a*. The interface for extension transmission/reception server 235 transmits/receives the user data and the extension transmission/reception control data to/from the extension transmission/reception server 230*b*.

The configuration of the BSs 220*a* and 220*b* is substantially the same as the configuration of the BS 20*a* shown in FIG. 5. However, the BSs 220*a* and 220*b* notify the MSC 60 of the traffic load at the BSs 220*a* and 220*b* as the determination information. Specifically, the control signal process unit 24 obtains information indicating the traffic load at the BSs such as usage status of the radio channel and usage status of the radio resources from the radio transmission/reception unit 21. The usage status of the radio resources includes usage status of transmission power, frequency and time slot and the like. Based on the obtained usage status such as usage status of the radio channel or usage status of the radio resources, the control signal process unit 24 calculates the usage rate of the radio channel or the usage rate of the radio resources, and generates determination information indicating the traffic load at the BSs.

The control signal process unit 24 inputs the determination information indicating the traffic load at the BSs to the interface for RNC 22. The interface for RNC 22 transmits the determination information indicating the traffic load at the BSs, which is obtained from the control signal process unit 24 to the MSC 60 via the RNCs 240*a* and 240*b*. Thus, the control signal process unit 24 also functions as a traffic load obtaining unit, which obtains the traffic load. Also, the interface for RNC 22 functions as a determination information transmission unit, which transmits the determination information.

As the determination information, in addition to the existence or absence of the extension transmission/reception server, which is capable of transmitting/receiving of the user data to/from the BSs, the MSC 60 uses the traffic load in the radio access networks 250*a* and 250*b*. The MSC 60 uses the traffic load at the BSs as the traffic load in the radio access networks 250*a* and 250*b*. Specifically, the interface for RNC 61 shown in FIG. 8 receives the determination information, which indicates the traffic load at the BSs, from the BSs 220*a* and 220*b* via the RNCs 240*a* and 240*b*. Thus, the interface for RNC 61 functions also as a determination information reception unit, which receives the determination information. The interface for RNC 61 inputs the received determination information, which indicates the traffic load, to the control signal process unit 63. The control signal process unit 63 inputs the obtained determination information, which indicates the traffic load to the extension transmission/reception determination unit 66.

First, based on the connection information, which is stored in the connection information database 65, the extension transmission/reception determination unit 66 determines whether or not there exist any extension transmission/reception server connecting to the BS. When it is determined that there exist both of the extension transmission/reception server connecting to a BS connecting to the communication source MS, and the extension transmission/reception server connecting to a BS connecting to the communication destination MS, based on the traffic load at the BSs connecting to the communication source MS and communication destination MS, the extension transmission/reception determination unit 66 determines whether or not the transmission/reception of the user data is carried out by using the extension transmission/reception.

The extension transmission/reception determination unit 66 stores acceptable threshold of the traffic load in the radio access networks 250a and 250b, which serves as the reference for determining whether the transmission/reception of the user data is carried out by using the extension transmission/reception (hereinafter, referred to as "extension traffic threshold"). The extension traffic threshold may be set in the extension transmission/reception determination unit 66 in advance, or may be appropriately set and update in the extension transmission/reception determination unit 66 by the extension transmission/reception determination unit 66.

FIG. 15 shows the traffic load and the extension traffic threshold of each BS when the channel usage rate is used as the determination information, which indicates the traffic load. In FIG. 15, the extension traffic threshold is set to 80%. The BS name of the BS 220a is "BS01", the BS name of the BS 220b is "BS02". The channel usage rate at the BS 220a is 30%; and the channel usage rate at the BS 220b is 10%. The extension traffic threshold may be set on the radio access network basis, on the RNC basis, on the extension transmission/reception server basis or on the BS basis.

The extension transmission/reception determination unit 66 compares the determination information indicating the traffic load of the BSs, which is obtained from the control signal process unit 63, and the extension traffic threshold, and thereby, determines whether or not the transmission/reception of the user data is carried out by using the extension transmission/reception. When the traffic load at the BSs0 connecting to the communication source MS and communication destination MS, is lower than the extension traffic threshold, the extension transmission/reception determination unit 66 determines to carry out the transmission/reception of the user data by using the extension transmission/reception. And the extension transmission/reception determination unit 66 selects the extension transmission/reception server, which is used for the extension transmission/reception. When there exist a plurality of extension transmission/reception servers connecting to the BSs, the extension transmission/reception determination unit 66 can select the extension transmission/reception server to be used based on the traffic load and the process capacity of the extension transmission/reception server.

On the other hand, when it is determined that either one of the extension transmission/reception server connecting BS connecting to the communication source MS, or the extension transmission/reception server connecting to the BS connecting to the communication destination MS does not exist, and when the traffic load at the BSs connecting to the communication source MS and the communication destination MS exceeds the extension traffic threshold, the extension transmission/reception determination unit 66 determines not to carry out the transmission/reception of the user data by using the extension transmission/reception. Further, the extension transmission/reception determination unit 66 determines to carry out the transmission/reception of the user data via the MSC 60 or not to carry out the transmission itself of the user data.

For example, the extension transmission/reception determination unit 66 stores allowance threshold of the traffic load in the radio access network, which serves as the reference for determining whether or not the transmission/reception itself of the user data is carried out (hereinafter, referred to as "communication traffic threshold"). And the extension transmission/reception determination unit 66 compares the determination information indicating the traffic load, which is obtained from the control signal process unit 63, and the communication traffic threshold, and thereby determines to carry out the transmission/reception of the user data via the MSC 60, or not to carry out the transmission/reception itself of the user data. The extension transmission/reception determination unit 66 determines, when the traffic load at the BSs connecting to the communication source MS and the communication destination MS are lower than the communication traffic threshold, to carry out the transmission/reception of the user data via the MSC 60, and when the communication traffic threshold is exceeded, not to carry out the transmission/reception itself of the user data. And the extension transmission/reception determination unit 66 inputs the determination result to the control signal process unit 63.

(Communication Method)

Figure 16:
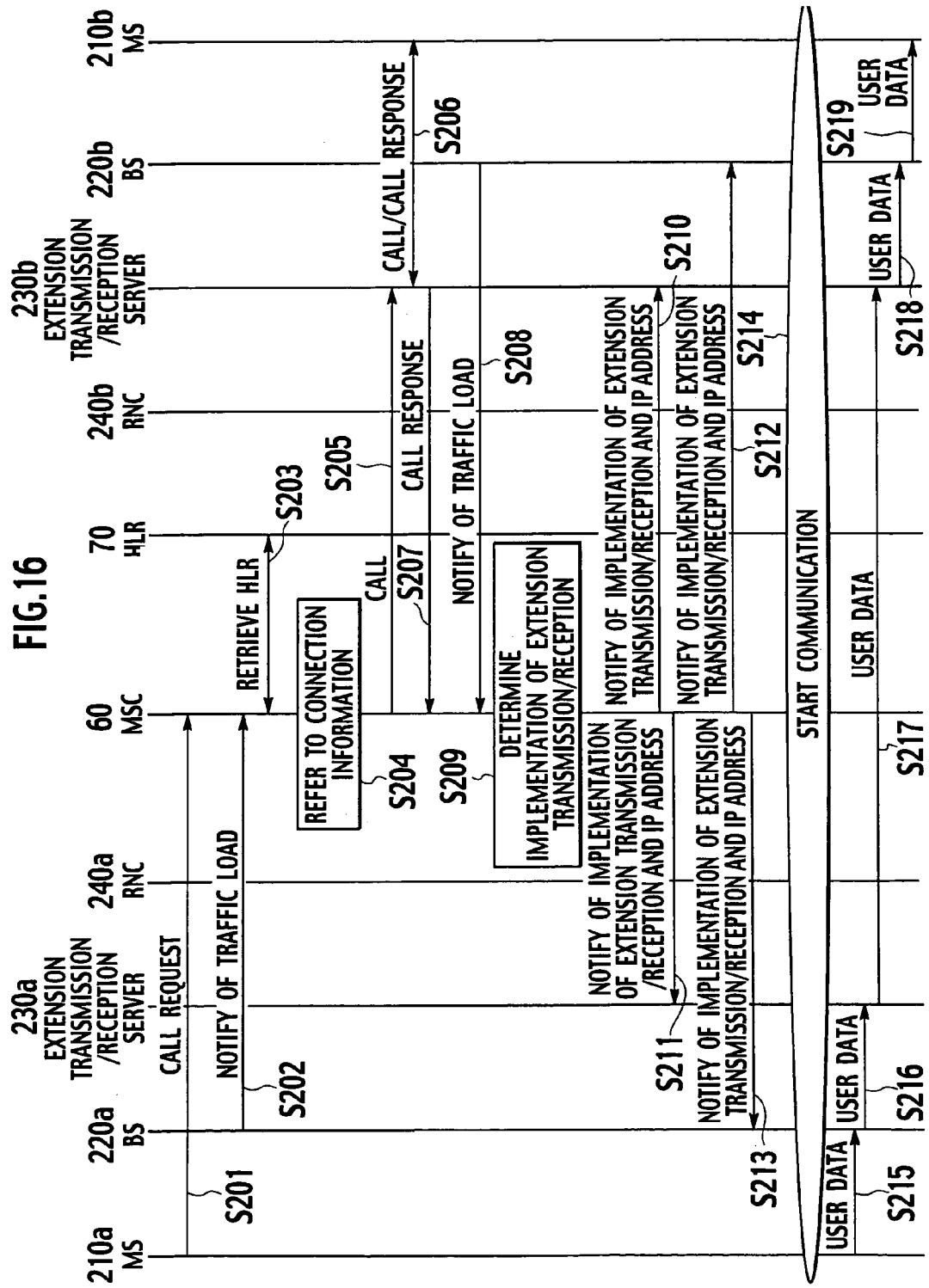
FIG. 16 is a flow chart showing a procedure of the communication method in accordance with the second embodiment of the present invention.

Referring to FIG. 16, the communication method with the mobile communication system 200 will be described. First, the MS 210a transmits a call request, which requests for a transmission of user data to the MS 210b, to the MSC 60 via the BS 220a and the RNC 240a (S201). The BS 220a, which has relayed the call request from the MS 210a, notifies the MSC 60 of the traffic load at the BS 220a (S202). The MSC 60 retrieve the HLR 70. Specifically, the MSC 60 refers to the HLR 70, and obtains identification information of the BSs 220a and 220b, to which the MS 210a (communication source MS) and the MS 210b (communication destination MS) are connected respectively, as subscriber information (S203). According to this, the MSC 60 detects that each of the MSs 210a and 210b connect to the BSs 220a and 220b respectively.

Based on the identification information of the BSs 220a and 220b, the MSC 60 refers to connection information of the BSs 220a and 220b. According to this, the MSC 60 detects that the BS 220a connecting to the MS 210a connects to the extension transmission/reception server 230a, and the BS 220b connecting to the MS 210b connects to the extension transmission/reception server 230b (S204). Then, the MSC 60 gives an instruction to the RNC 240b to call the MS 210b (S205). Receiving the instruction, the RNC 240b calls the MS 210b, and the MS 210b responses the call via the BS 220b (S206). The RNC 240b notifies the MSC 60 that the call response has been received (S207).

Further, the BS 220b, which has relayed the call response from the MS 210b, notifies the MSC 60 of the traffic load in the BS 220b (S208). The MSC 60 compares the traffic load in the BSs 220a and 220b received at steps (S202) and (S208) with the extension traffic threshold. Since the traffic load and the extension traffic threshold in the BSs 220a and 220b are as shown in FIG. 15, the MSC 60 determines that both of the traffic loads in the BS 220a and the traffic loads in the BS 220b, which connects to the MS 210a (communication source MS) and MS 210b (communication destination MS) are lower than the extension traffic threshold. Accordingly, the MSC 60 determines to carry out the transmission/reception of the user data by using the extension transmission/reception, and selects the extension transmission/reception servers 230a and 230b as the extension transmission/reception server used for the extension transmission/reception (S209).

The MSC 60 notifies the extension transmission/reception servers 230a and 230b the implementation of transmission/reception of the user data transmitted/received between the MS 210a and MS 210b by using the extension transmission/reception. Further, the MSC 60 notifies the extension transmission/reception server 230b of the IP address of the extension transmission/reception server 230a, which is the communication source extension transmission/reception server (S210). And the MSC 60 notifies the extension transmission/reception server 230a of the IP address of the extension transmission/reception server 230b, which is the communication destination extension transmission/reception server (S211).

Further, the MSC 60 notifies the BS 220b connecting to the MS 210b (communication destination MS), and the BS 220a connecting to the MS 210a (communication source MS) of implementation of the transmission/reception by using the extension transmission/reception. And, the MSC 60 notifies the BS 220b of the IP address of the extension transmission/reception server 230b to be used for the extension transmission/reception, and the BS 220a of the IP address of the extension transmission/reception server 230a to be used for the extension transmission/reception (S212), (S213).

According to the above-described processing, the communication is started between the MS 210a and the MS 210b (S214). After starting the communication, the MS 210a (communication source MS) transmits the user data to the BS 220a (S211). The BS 220a converts the destination IP address of the user data received from the MS 210a into the IP address of the extension transmission/reception server 230a, or encapsulates the received user data with the IP address of the extension transmission/reception server 230a. And the BS 220a transmits the same to the extension transmission/reception server 230a (S216).

The extension transmission/reception server 230a converts the destination IP address of the user data, which are received from the BS 220a, into the IP address of the extension transmission/reception server 230b, or encapsulates the received user data with the IP address of the extension transmission/reception server 230b in stead of the IP address of the extension transmission/reception server 230a. And the extension transmission/reception server 230a transmits the user data to the extension transmission/reception server 230b (S217). In step (S217), the user data are transmitted/received without going through the RNCs 240a and 240b and the MSC 60.

The extension transmission/reception server 230b inverts the destination IP address of the user data, which are received from the extension transmission/reception server 230a, to the IP address of the MS 210b (communication destination MS), or decapsulates the received user data. Then the extension transmission/reception server 230b directly transmits the user data to the BS 220b by using the extension transmission/reception (S218). The BS 220b transmits the received user data to the MS 210b (S219).

Figure 17:
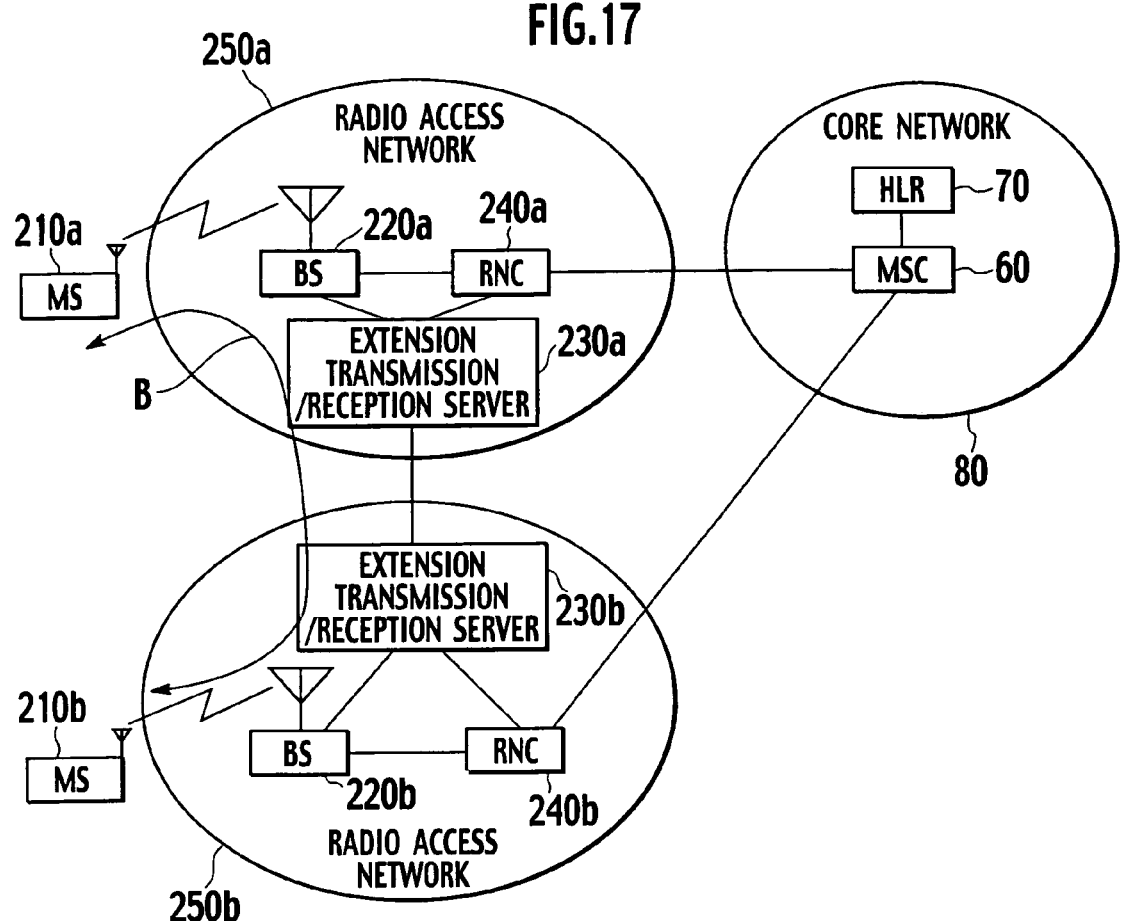
FIG. 17 is a view showing paths for user data in accordance with the second embodiment of the present invention.

Accordingly, in the mobile communication system 200, when the user data are transmitted/received by using the extension transmission/reception, the path B of the user data is resulted in as shown in FIG. 17. The user data are, without using the MSC 60, transmitted/received via path B, which goes through the MS 210a, the BS 220a, the extension transmission/reception server 230a, the extension transmission/reception server 230b and the BS 220b to the MS 210b.

That is, when the MS 210a (communication source MS) and the MS 210b (communication destination MS) connect to the extension transmission/reception servers 230a and 230b representatively, which are different from each other, and the BSs 220a and 220b, which are capable of transmitting/receiving the user data, the BS 220a (communication source BS) connecting to the MS 210a (communication source MS) receives the user data transmitted from the MS 210a (communication source MS), and transmits the user data to the extension transmission/reception server 230a (communication source extension transmission/reception server), which is capable of transmitting/receiving the user data to/from the BS 220a (communication source BS) without using the MSC 60.

The extension transmission/reception server 230a (communication source extension transmission/reception server) receives the user data from the BS 220a (communication source BS), and transmits the user data to the extension transmission/reception server 230b (communication destination extension transmission/reception server), which is capable of transmitting/receiving the user data to/from the BS 220b (communication destination BS) connecting to the MS 210b (communication destination MS). The extension transmission/reception server 230b (communication destination extension transmission/reception server) receives the user data from the extension transmission/reception server 230a (communication source extension transmission/reception server) and transmits the user data to the BS 220b (communication destination BS).

The BS 220b (communication destination BS) receives the user data from the extension transmission/reception server 230b (communication destination extension transmission/reception server) and transmits the user data to the MS 220b (communication destination MS). Accordingly, the data transmitted from the MS 210a (communication source MS) reaches the MS 210b (communication destination MS) through path B in the radio access networks 250a and 250b.

After the communication has been started in step (S214), the BSs 220a and 220b transmit/receive the MS control data, which are transmitted/received between the MSs 210a and 210b via the MSC 60. Accordingly, the MS control data, which are transmitted/received between the MSs 210a and 210b, are transmitted/received via the MSC 60. Also, in step (S209), when any of the traffic loads at the BSs 220a and 220b connecting to the MS 210a (communication source MS) and the MS 210b (communication destination MS) exceeds the extension traffic threshold, the MSC 60 determines not to carry out the transmission/reception of the user data by using the extension transmission/reception. Therefore, the MSC 60 determines that the transmission/reception of the user data by using the MSC 60 is carried out, or the transmission/reception itself of the user data is not carried out. The MSC 60 notifies the BSs 220a and 220b of the determination result.

Receiving the notification that the transmission/reception of the user data via the MSC 60 is carried out, the BS 220a transmits the user data received from the MS 210a to the RNC 240a. The RNC 240a transmits the user data to the MSC 60. The MSC 60 transmits the user data to the MS 210b through the RNC 240b and the BS 220b. Also, receiving the notification that the transmission/reception itself of the user data is not carried out, the BSs 220a and 220b notify the MSs 210a and 201b that the communication disconnects. And the MSs 210a and 210b, the BSs 220a and 220b, the RNC 240a and 240b and the MSC 60 disconnects the line.

According to the mobile communication system 200, the BSs 220a and 220b, the extension transmission/reception server 230a and 230b, the MSC 60 and the communication method as described above, in addition to the effect, which is obtained by the mobile communication system 100, the BS 20a and 20b and the extension transmission/reception server 30 shown in FIG. 4, the following effects can be obtained.

The mobile communication system 200 includes a plurality of extension transmission/reception servers 230a and 230b. Further, the extension transmission/reception servers 230a and 230b includes the interface for extension transmission/reception server 235. Accordingly, the user data can be transmitted/received with another extension transmission/reception servers 230 band 230a by using the extension transmission/reception. That is, the extension transmission/reception servers 230a and 230b can transmit/receive the user data by using the extension transmission/reception. Accordingly, the mobile communication system 200 can readily expand the area where the extension transmission/reception is available, i.e., the range where the user data can be transmitted/received by using the extension transmission/reception. Consequently, such advantages that, for example, the convenience is increased, the line use fee of the user is further reduced can be obtained.

Further, according to the mobile communication system 200 and the MSC 60, the extension transmission/reception determination unit 66 determines whether or not the transmission/reception of the user data is carried out by using the extension transmission/reception based on the traffic load in the radio access networks 250a and 250b. According to this, it is possible to control that the transmission/reception of the user data is carried out by using the extension transmission/reception or the MSC 60, or whether or not the transmission/reception itself of the user data is carried out based on the traffic load in the radio access networks 250a and 250b. Accordingly, the mobile communication system 200 can maintain the quality of the transmission/reception of the user data by using the extension transmission/reception, or distribute the traffic.

Embodiment 3

Mobile Communication System

Figure 18:
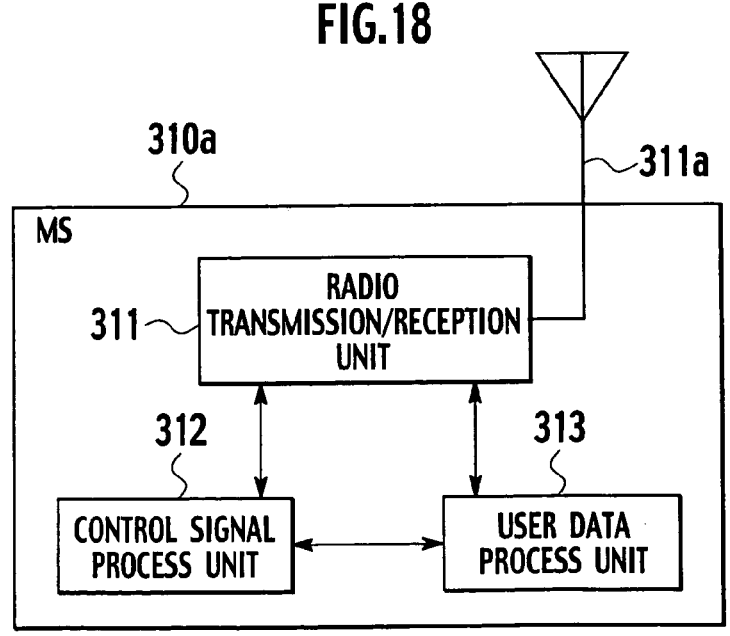
FIG. 18 is a view showing configuration of a MS in accordance with a third embodiment of the present invention.

A mobile communication system according to Embodiment 3 is substantially the same as the mobile communication system 200 shown in FIG. 13 except for a point that an MS 310a is used in place of the MS 210a. As shown in FIG. 18, the MS 310a includes a radio transmission/reception unit 311, a control signal process unit 312 and a user data process unit 313.

The user data process unit 313 generates user data to be transmitted by the MS 310a. And the user data process unit 313 outputs the user data received by the MS 310a. The user data process unit 313 inputs the generated user data to the radio transmission/reception unit 311, and obtains the data received by the radio transmission/reception unit 311, from the radio transmission/reception unit 311.

The control signal process unit 312 processes the control data transmitted/received by the MS 310a. Specifically, the control signal process unit 312 generates a call request and MS control data such as a response to the call. Also, the control signal process unit 312 generates an extension transmission/reception request as the extension transmission/reception control data, which requests the user data to be transmitted/received by using the extension transmission/reception transmitting/receiving the data within the radio access networks 250a and 250b. When a user using the MS 310a, for example, a thing such as a terminal or a person, requires the user data to be transmitted/received by using the extension transmission/reception, the control signal process unit 312 generates the extension transmission/reception request.

For example, when an input is received from the user, the control signal process unit 312 generates the extension transmission/reception request. Also, the control signal process unit 312 obtains information about the user data, which are generated by the user data process unit 313, from the user data process unit 313, and determines whether or not the user requires the extension transmission/reception based on the information. When it is determined that the user requires the extension transmission/reception, the control signal process unit 312 generates the extension transmission/reception request.

Or, when preset conditions are satisfied, the control signal process unit 312 may determine that the user requires the extension transmission/reception, and generates the extension transmission/reception request. The control signal process unit 312 inputs the generated MS control data and the extension transmission/reception request to the radio transmission/reception unit 311.

The radio transmission/reception unit 311 carries out the radio communication to transmit/receive the user data and the control data to/from the BS 220a via the radio. The radio transmission/reception unit 311 connects to an antenna 311a, and carries out the radio communication with the BS 220a via the antenna 311a. The radio transmission/reception unit 311 inputs the received user data to the user data process unit 313. The radio transmission/reception unit 311 obtains the user data generated by the user data process unit 313, from the user data process unit 313, and transmits the user data. Also, the radio transmission/reception unit 311 inputs the received control data to the control signal process unit 312. The radio transmission/reception unit 311 obtains MS control data generated by the control signal process unit 312 and the extension transmission/reception request from the control signal process unit 312, and transmits the user data. As described above, the radio transmission/reception unit 311 functions as a request transmission unit, which transmits the extension transmission/reception request. The radio transmission/reception unit 311 transmits the extension transmission/reception request to the MSC 60 via the BS 220a and the RNC 240a.

Further, the MSC 60 uses, in addition to the existence or absence of the extension transmission/reception server, which is capable of transmitting/receiving the user data to/from the BS, the request for the extension transmission/reception from the MS 310a as the determination information. Specifically, the interface for RNC 61 shown in FIG. 8 receives the extension transmission/reception request from the MS 310a via the RNCs 240a and 240b. As described above, the interface for RNC 61 functions as the request reception unit, which receives the extension transmission/reception request. The interface for RNC 61 inputs the received extension transmission/reception request to the control signal process unit 63. The control signal process unit 63 inputs the obtained extension transmission/reception request to the extension transmission/reception determination unit 66.

First, the extension transmission/reception determination unit 66 determines the existence or absence of the extension transmission and reception request. The extension transmission/reception determination unit 66 determines the existence or absence of the extension transmission/reception request based on the existence or absence of the input of the extension transmission/reception request from the control signal process unit 63. When there is no input of the extension transmission/reception request from the control signal process unit 63, the extension transmissions/reception determination unit 66 determines that there is no extension transmission/reception request, and at this point, determines that the transmission/reception of the user data by using the extension transmission/reception is not carried out. And the extension transmissions/reception determination unit 66 determines to carry out the transmission/reception of the user data via the MSC 60.

On the other hand, when an input of the extension transmission/reception request obtained from the control signal process unit 63, the extension transmission/reception determination unit 66 determines that there is an extension transmission/reception request. And the extension transmission/ reception determination unit 66, in the same manner as the first embodiment, determines whether or not the transmission/reception of the user data is carried out by using the extension transmission/reception based on connection information stored in the connection information database 65.

(Communication Method)

Figure 19:
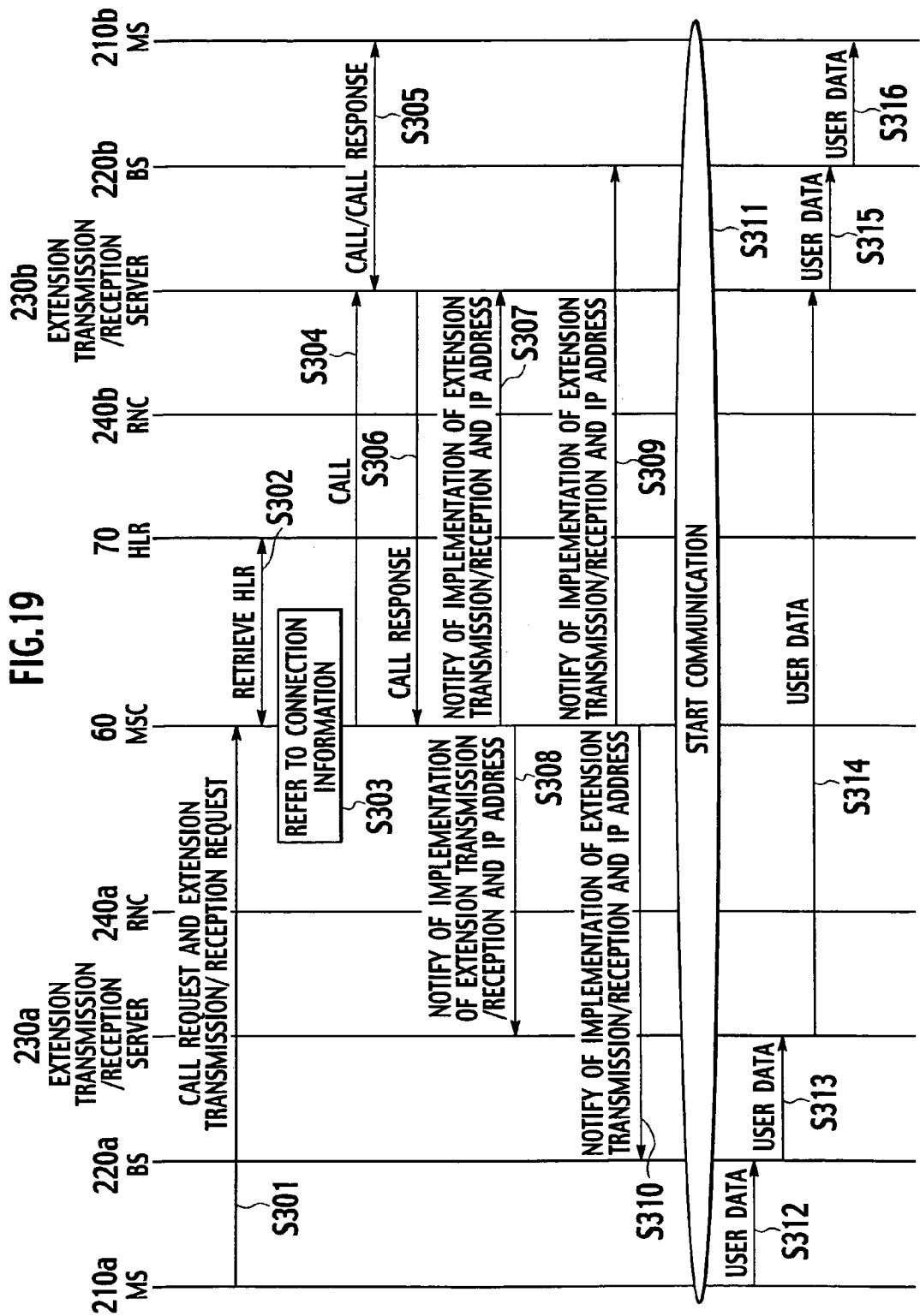
FIG. 19 is a flow chart showing a procedure of the communication method in accordance with the third embodiment of the present invention.

Referring to FIG. 19, the communication method of the case where, in the mobile communication system 200, in place of the MS 210*a*, a MS 310*a* is used, will be described. First, the MS 310*a* transmits a call request, which requests for a transmission of user data to the MS 210*b*, and the extension transmission/reception request, to the MSC 60 via the BS 220*a* and the RNC 240*a* (S301). Then, steps (S302)-(S316) are carried out. The steps (S302)-(S316) are substantially the same as the steps (S203)-(S207) and (S210)-(S219) shown in FIG. 16.

In step (S303), the MSC 60 detects that the BS 220*a* connecting to the MS 310*a* connects to the extension transmission/reception server 230*a*, and the BS 220*b* connecting to the MS 210*b* connects to the extension transmission/reception server 230*b*. Since there exist both of the extension transmission/reception servers 230*a* and connecting to the BS 220*a* and the extension transmission/reception servers 230*b* connecting to the BS 220*b*, the MSC 60 determines to carry out the transmission/reception of the user data by using the extension transmission/reception, and selects the extension transmission/reception servers 230*a* and 230*b* as the extension transmission/reception server used for the extension transmission/reception.

Also, in step (S301), when no extension transmission/reception request is given from the MS 310*a*, the MSC 60 determines not to carry out the transmission/reception of the user data by using the extension transmission/reception. And the MSC 60 does not proceed to step (S302), but determines to carry out the transmission/reception of the user data via the MSC 60. Accordingly, the user data transmitted from the MS 310*a* are received by the MS 210*b* via the BS 220*a*, the RNC 240*a*, the MSC 60, the RNC 240*b* and the BS 220*b*.

According to the mobile communication system, the MS 310*a*, the BSs 220*a* and 220*b*, the extension transmission/reception servers 230*a* and 230*b*, the MSC 60 and the communication method, in addition to the effect, which is obtained by the mobile communication system 200, the BSs 220*a* and 220*b*, the extension transmission/reception servers 230*a* and 230*b* and the MSC 60 shown in FIG. 13, the following effect can be obtained.

When a user of the MS 310*a* requires to transmit/receive the user data by using the extension transmission/reception, the transmission/reception of the user data by using the extension transmission/reception can be requested to the controller MSC 60. And since the extension transmission/reception determination unit 66 of the MSC 60 can determine whether or not the transmission/reception of the user data by using the extension transmission/reception should be carried out based on the extension transmission/reception request from the MS 310*a*, the mobile communication system can transmit/receive the user data swiftly by using the extension transmission/reception corresponding to the request of the user. Therefore, the convenience is increased.

[Modification]

The present invention is not limited to the above-described first-third embodiments, and various modifications are possible. In the mobile communication systems 100 and 200 shown in FIG. 4 and FIG. 13, the MSC 60 functions as the extension transmission/reception controller, which determines whether or not the user data is transmitted/received by using the extension transmission/reception. However, the extension transmission/reception controller is not limited to the MSC 60. The BSs 20*a* and 20*b*, 220*a* and 220*b*, the RNC 40*a* and 40*b*, 240*a* and 240*b*, the extension transmission/reception servers 30, 230*a* or 230*b* may function as the extension transmissions/reception controller. Or, the extension transmission/reception controller may be provided somewhere in the radio access networks 50, 250*a* and 250*b* or the core network 80.

In such case, the BSs 20*a* and 20*b*, 220*a* and 220*b*, the RNCs 40*a* and 40*b*, 240*a* and 240*b*, the extension transmission/reception servers 30, 230*a* and 230*b* and a newly provided controller includes the extension transmission/reception determination unit 66, the connection information database 65, a determination information reception unit served by the interface for RNC 61, a request reception unit, a determination result transmission unit and a obtaining unit, which obtains the relationship between an MS and a BS connecting to the MS from the MSC 60 or HLR 70.

In the mobile communication systems 100 and 200 shown in FIGS. 4 and 13, the MSC 60 is used. However, a distribution MSC and integration MSC may be used as the MSC. In this case, also, according to the user data transmitted/received by using the extension transmission/reception, the path of the user data for carrying out the communication between the MSs, which are controlled under the distribution MSCs different from each other, can be shortened.

Further, in the mobile communication systems 100 and 200, the traffic load at the BSs is used as the traffic load in the radio access network. However, the traffic load at the extension transmission/reception servers 30, 230*a* and 230*b* provided in the radio access networks 50, 250*a* and 250*b*, or the traffic load at the RNCs 40*a* and 40*b*, 240*a* and 240*b* may be used. Further, a traffic load obtained by combining at least two of the traffic load at the BSs, the traffic load at the extension transmission/reception servers 30, 230*a* and 230*b* and the traffic load at the RNCs 40*a* and 40*b*, 240*a* and 240*b*, may be used as the traffic load in the radio access network. In such case, the extension transmission/reception servers 30, 230*a* and 230*b* and the RNCs 40*a* and 40*b*, 240*a* and 240*b* include a traffic load obtaining unit obtaining the traffic load and a determination information transmission unit.

Furthermore, the extension transmission/reception determination unit 66 determines whether or not the transmission/reception of the user data is carried out by using the extension transmission/reception based on the traffic load. Accordingly, the quality of the service provided by a communication service provider can be preset minutely. In this case, the quality of the service for the respective users is registered as the subscriber information in the HLR 70. In addition to the traffic load, by using the subscriber information, the extension transmission/reception determination unit 66 determines whether or not the transmission/reception of the user data is carried out by using the extension transmission/reception. According to this, the extension transmissions/reception determination unit 66 can identify the service subscribed by the user and thus provide appropriate service to the respective users.

In addition, the extension transmission/reception determination unit 66 can use the process capacity of the extension transmission/reception server as the determination information, whether or not the transmission/reception of the user data is carried out by using the extension transmission/reception. As a result, the extension transmission/reception determination unit 66 can control that the transmission/reception of the user data is carried out by using the extension transmission/reception or via the MSC 60 based on the process capacity of the extension transmission/reception server. Accordingly, the mobile communication system can maintain the quality of the transmission/reception of the user data by using the extension transmission/reception and distribute the load.

Further, the extension transmission/reception determination unit 66 can determine based on the following conditions by combining two or more thereof, i.e., the traffic load in the radio access network, the process capacity of the extension transmission/reception server, the extension transmission/reception request from the MS and the existence or absence of the extension transmission/reception server, which is capable of transmitting/receiving the user data to/from the BS.

In addition, the MSC 60 receives the extension transmission/reception request transmitted from the MS 310a, and thereby, recognizes that the user requests for the extension transmission/reception. However, the existence or absence of the extension transmission/reception request of the MS can be registered in the HLR 70 as the subscriber information in advance. In this case, the MSC 60 obtains the existence or absence of the extension transmission/reception request from the HLR 70 as the subscriber information and utilizes the same as the determination information.

In FIG. 4 and FIG. 10, the extension transmission/reception servers 30, 230a and 230b transmit/receive the user data to/from the BSs and another extension transmission/reception server by using the extension transmission/reception are arranged. The BS and radio network controller can function as the extension transmission/reception server.

Figure 20:
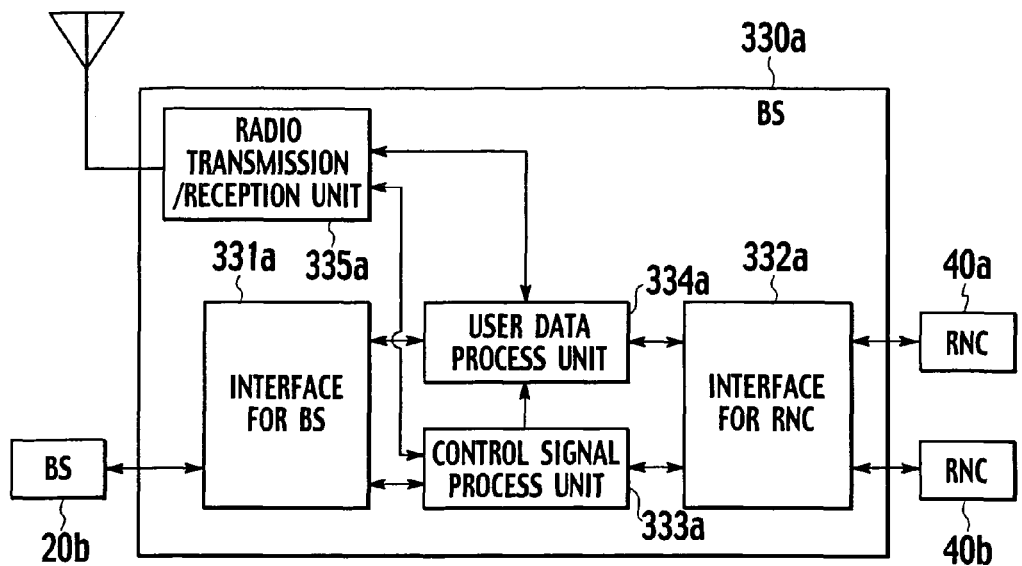
FIG. 20 is a block diagram showing configuration of a base station in accordance with a modification of the present invention.

For example, the BS 330a shown in FIG. 20 transmits/receives the user data to/from another BS 20b by using the extension transmission/reception, which transmits/receives the data within the radio access network. The BS 330a includes an interface for BS 331a, an interface for RNC 332a, a control signal process unit 333a, a user data process unit 334a and a radio transmission/reception unit 335a.

The interface for BS 331a is substantially the same as the interface for BS 31 shown in FIG. 6. The interface for BS 331a serves as the base station transmission/reception unit that transmits/receives the user data to/from another BS 20b by using the extension transmission/reception. The interface for RNC 332a functions as the interface for RNC 22 shown in FIG. 5 and the interface for RNC 32 shown in FIG. 6. The control signal process unit 333a functions as the control signal process unit 24 shown in FIG. 5 and the control signal process unit 33 shown in FIG. 6. The user data process unit 334a functions as the user data process unit 25 shown in FIG. 5 and the user data process unit 34 shown in FIG. 6. The radio transmission/reception unit 335a is substantially the same as the radio transmission/reception unit 21 shown in FIG. 5.

The BS 330a as described above may be used in place of the BS 20a and the extension transmission/reception server 30 shown in FIG. 4. The BS 330a serves both of the function of the extension transmission/reception, which transmits/receives the user data to/from the BS 20b by using the extension transmission/reception and the function of the BS, which performs radio communication with the MS 10a. Specifically, the interface for BS 331b transmits/receives the user data to/from another BS 20b by using the extension transmission/reception. Accordingly, the BS 330a can transmit/receive the user data to/from another BS 20b without using the MSC 60, which is located outside the radio access network 50. Accordingly, the BS 330a can shorten the path for the user data.

Figure 21:
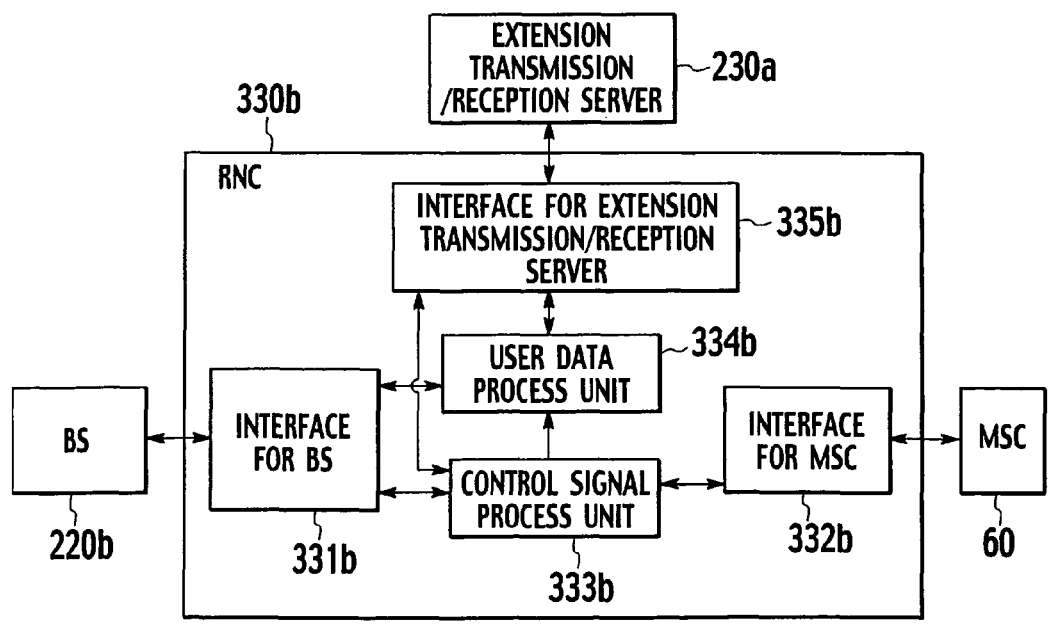
FIG. 21 is a block diagram showing configuration of a radio network controller in accordance with the modification of the present invention.

Also, the RNC 330b shown in FIG. 21 transmits/receives the user data to/from the BS 220b and the extension transmission/reception server 230a by using the extension transmission/reception, which transmits/receives the data within the radio access network. The RNC 330b includes an interface for BS 331b, the interface for MSC 332b, a control signal process unit 333b, a user data process unit 334b and an interface for extension transmission/reception server 335b.

The interface for BS 331b functions as the interface for BS 41 shown in FIG. 7 and the interface for BS 231 shown in FIG. 14. The interface for BS 331b function as the base station transmission/reception unit, which transmits/receives the user data to/from BS 220b by using the extension transmission/reception, which transmits/receives the data within the radio access network. The interface for MSC 332b is substantially the same as the interface for MSC 43 shown in FIG. 7. The control signal process unit 333b functions as the control signal process unit 44 shown in FIG. 7 and the control signal process unit 233 shown in FIG. 14. The user data process unit 334b functions as the user data process unit 45 shown in FIG. 7 and the user data process unit 234 shown in FIG. 14. The interface for extension transmission/reception server 335b is substantially the same as the interface for extension transmission/reception server 235 shown in FIG. 14. The interface for extension transmission/reception server 335b serves as the extension transmission/reception unit, which transmits/receives the user data to/from another extension transmission/reception server 230a by using the extension transmission/reception.

The RNC 330b as described above may be used in place of the RNC 240b and the extension transmission/reception server 230b shown in FIG. 13. Therefore, the RNC 330b serves both of the function of the extension transmission/reception, which transmits/receives the user data to/from the BS 220b and the extension transmission/reception server 230a by using the extension transmission/reception and the function of the RNC, which controls the radio communication carried out between the MS 210b and the BS 220b.

Specifically, the interface for BS 331b transmits/receives the user data to/from the BS 220b by using the extension transmission/reception. Further, the interface for extension transmission/reception server 335b transmits/receives the user data to/from the extension transmission/reception server 230a by using the extension transmission/reception. Accordingly, the RNC 330b can transmit/receive the user data to/from the BS 220b without using the MSC 60 located outside the radio access networks 250a and 250b. Accordingly, the RNC 330b can shorten the path for the user data. Furthermore, the RNC 330b can readily increase the range where the user data can be transmitted/received by using the extension transmission/reception, that is, the area where the extension transmission/reception is available.

Various modifications will become possible for those skilled in the art after receiving the teachings of the present disclosure without departing from the scope thereof.

What is claimed is:

1. A mobile communication system including a radio access network having at least two base stations and being managed by a mobile switching center, the mobile communication system comprising:

an extension transmission/reception server, provided in the radio access network, configured to transmit/receive data with a first base station of the at least two base stations using an extension transmission/reception of data in the radio access network;

a connection information database configured to store connection information which includes a first information and a second information, the first information associating a first base station, connected to a first mobile station, with an identifier of an extension transmission/ reception server connected to the first base station and an IP address of the extension transmission/reception server, the second information associating a second base station, connected to a second mobile station, with an identifier of an extension transmission/reception server connected to the second base station and an IP address of the extension transmission/reception server;

a first determination unit configured to determine to transmit/receive user data using extension transmission/reception when traffic load of each of the first base station and the second base station is lower than an acceptable threshold, and configured to determine not to transmit/receive user data using extension transmission/reception when the traffic load exceeds the acceptable threshold, a second determination unit configured to determine whether common extension transmission/reception servers exist between the first and second base stations with reference to the connection information when the first determination unit determines to transmit/receive user data using extension transmission reception, the common extension transmission/reception server being configured to transmit/receive user data between the first mobile station and the second mobile station using extension transmission/reception; and a selection unit configured to select one of the common extension transmission/reception server from the available extension transmission/reception servers, when available extension transmission/reception servers common between the first and second base stations exist, and to derive an IP address corresponding to an identifier of the selected one of the common extension transmission/reception servers, wherein the selection unit is configured to select the common extension transmission/reception server based on traffic load or process capacity of the available extension transmission/reception servers.

2. The mobile communication system of claim 1, wherein
the first base station receives the user data from the first mobile station, and transmits the user data to the common extension transmission/reception server;
the common extension transmission/reception server receives the user data from the first base station, and transmits the user data to the second base station; and
the second base station receives the user data from the common extension transmission/reception server, and transmits the user data to the second mobile station.

3. The mobile communication system of claim 1, wherein the selection unit selects a first extension transmission/reception server connected to the first base station, from the available extension transmission/reception servers, and selects a second extension transmission/reception server connected to the second base station, from the available extension transmission/reception servers, and the first extension transmission/reception server and the second extension transmission/reception server transmit/receive the user data by using extension transmission/reception therebetween.

4. The mobile communication system of claim 3, wherein the first base station receives the user data from the first mobile station, and transmits the user data to the first extension transmission/reception server; the first extension transmission/reception server receives the user data from the first base station, and transmits the user data to the second extension transmission/reception server; the second extension transmission/reception server receives the user data from the first extension transmission/reception server, and transmits the user data to the second base station; the second base station receives the user data from the second extension transmission/reception server, and transmits the user data to the second mobile station.

5. The mobile communication system of claim 1, wherein the first determination unit eliminates extension transmission/reception servers having traffic loads exceeding a predetermined threshold, from the available extension transmission/reception servers.

6. The mobile communication system of claim 1, wherein the base station transmits/receives mobile station control data transmitted/received between the first mobile station and the second mobile station via the mobile switching center.

7. A mobile switching center provided in a mobile communication system including a radio access network, the radio access network having at least two base stations managed by the mobile switching center and an extension transmission/reception server provided in the radio access network to transmit/receive data with the base stations using extension transmission/reception of data in the radio access network, the mobile switching center comprising:

a connection information database configured to store connection information which includes a first information and a second information, the first information associating a first base station, connected to a first mobile station, with an identifier of an extension transmission/reception server connected to the first base station and an IP address of the extension transmission/reception server, the second information associating a second base station, connected to a second mobile station, with an identifier of an extension transmission/reception server connected to the second base station and an IP address of the available extension transmission/reception server;

a first determination unit configured to determine to transmit/receive user data using extension transmission/reception when traffic load of each of the first base station and the second base station is lower than an acceptable threshold, and configured to determine not to transmit/receive user data using extension transmission/reception when the traffic load exceeds the acceptable threshold;

a second determination unit configured to determine whether common extension transmission/reception servers exist between the first and second base stations with reference to the connection information when the first determination unit determines to transmit/receive user data using extension transmission reception, the common extension transmission/reception server being configured to transmit/receive user data between the first mobile station and the second mobile station using extension transmission/reception; and a selection unit configured to select the common extension transmission/reception server from the available extension transmission/reception servers, when available extension transmission/reception servers connected to the first and second bases stations exist, and to derive an IP address corresponding to an identifier of the selected common extension transmission/reception server, wherein the selection unit is configured to select the common extension transmission/reception server based on traffic load or process capacity of the available extension transmission/reception servers.

8. A communication method for transmitting/receiving data with at least two base stations respectively connected to at least two radio network controllers in a mobile communication system also including a mobile switching center configured to manage the base stations, and an extension transmission/reception server provided in the radio access network configured to transmit/receive data with the base stations using extension transmission/reception of data in the radio access network, the communication method comprising:
  determining to transmit/receive user data using extension transmission/reception when traffic load of each of the first base station and the second base station is lower than an acceptable threshold, and determining not to transmit/receive user data using extension transmission/reception when the traffic load exceeds the acceptable threshold;
  determining whether common extension transmission/reception servers exist between the first and second base stations with reference to the connection information when transmission/reception of user data using extension transmission reception is determined, the common extension transmission/reception server being configured to transmit/receive user data between the first mobile station and the second mobile station using extension transmission/reception; and
  selecting the common extension transmission/reception server from available extension transmission/reception servers, when the plurality of candidate extension transmission/reception servers between the first base station and the second base station exist, wherein the common extension transmission/reception server is selected based on traffic load or process capacity of the available extension transmission/reception servers, and the connection information includes a first information and a second information, the first information associating a first base station, connected to a first mobile station, with an identifier of an extension transmission/reception server connected to the first base station and an IP address of the extension transmission/reception server, the second information associating a second base station, connected to a second mobile station, with an identifier of an extension transmission/reception server connected to the second base station and an IP address of the extension transmission/reception server.

* * * * *